US008248640B2

(12) United States Patent
Tanaka et al.

(10) Patent No.: US 8,248,640 B2
(45) **Date of Patent: *Aug. 21, 2012**

(54) IMAGE FORMING APPARATUS, CONTROLLING UNIT, IMAGE FORMING METHOD AND COMPUTER READABLE MEDIUM

(75) Inventors: Satoshi Tanaka, Ebina (JP); Matsuyuki Aoki, Ebina (JP); Shunichiro Shishikura, Ebina (JP); Yasunori Unagida, Ebina (JP); Naoya Yamasaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1259 days.

This patent is subject to a terminal disclaimer.

(21) Appl. No.: 11/958,799

(22) Filed: Dec. 18, 2007

(65) Prior Publication Data

US 2008/0212826 A1 Sep. 4, 2008

(30) Foreign Application Priority Data

Jan. 5, 2007 (JP) ................................ 2007-000606

(51) Int. Cl.
*G06F 3/12* (2006.01)

(52) U.S. Cl. ......... 358/1.15; 358/452; 358/1.9; 358/1.2; 399/29; 399/254; 382/167; 382/254; 347/224; 347/228

(58) Field of Classification Search .................. 358/1.9, 358/1.15, 1.4, 518, 474, 403; 399/16, 49, 399/27, 254, 272, 45; 382/100, 254, 275; 347/224, 228, 240, 251–254
See application file for complete search history.

(56) References Cited

U.S. PATENT DOCUMENTS 4,624,548 A * 11/1986 Takayanagi .................... 399/55
4,872,025 A * 10/1989 Sekiya et al. ................ 347/254
5,016,039 A * 5/1991 Sosa et al. ...................... 396/50
5,146,272 A * 9/1992 Watanabe ....................... 399/53
5,264,871 A * 11/1993 Tsukada ....................... 347/253
5,689,760 A * 11/1997 Suzuki et al. .................. 399/45
5,953,497 A * 9/1999 Kokubo et al. ............... 358/1.9
6,271,940 B1 * 8/2001 Deschuytere et al. ........ 358/504

(Continued)

FOREIGN PATENT DOCUMENTS

JP 01-276175 A 11/1989

(Continued)

OTHER PUBLICATIONS

Notification of Reasons for Refusal issued on Apr. 3, 2012 in corresponding Japanese Application No. 2007-000606.

*Primary Examiner* — Negussie Worku
(74) *Attorney, Agent, or Firm* — Sughrue Mion, PLLC

(57) ABSTRACT

The image forming apparatus is provided with: an image forming unit that forms an image on a medium; a speed changing unit that changes an image forming speed of the image forming unit; a detecting unit that detects a state quantity indicating a state of the image on the medium formed by the image forming unit; and an adjusting unit that adjusts an image forming condition set by the image forming unit according to a detection result of the state quantity detected by the detecting unit and a target value for the state quantity. The adjusting unit changes the target value for the state quantity according to the state quantity detected by the detecting unit after the speed changing unit changes the image forming speed.

20 Claims, 16 Drawing Sheets

U.S. PATENT DOCUMENTS

| | | | | |
|---|---|---|---|---|
| 6,603,885 | B1 * | 8/2003 | Enomoto | 382/263 |
| 6,853,464 | B1 * | 2/2005 | Ueda et al. | 358/1.9 |
| 6,862,373 | B2 * | 3/2005 | Enomoto | 382/263 |
| 7,307,754 | B2 * | 12/2007 | Motoyama et al. | 358/1.9 |
| 7,453,608 | B2 * | 11/2008 | Kambegawa et al. | 358/500 |
| 7,486,414 | B2 * | 2/2009 | Arai | 358/1.9 |
| 7,538,918 | B2 * | 5/2009 | Oki | 358/521 |
| 7,619,775 | B2 * | 11/2009 | Kitamura et al. | 358/1.9 |
| 7,773,901 | B2 * | 8/2010 | Cho | 399/60 |
| 7,974,568 | B2 * | 7/2011 | Yamasaki et al. | 399/396 |
| 8,036,582 | B2 * | 10/2011 | Murata et al. | 399/302 |
| 8,120,825 | B2 * | 2/2012 | Akamatsu | 358/505 |
| 2007/0122171 | A1 * | 5/2007 | Fujimori et al. | 399/38 |
| 2007/0134012 | A1 * | 6/2007 | Suzuki et al. | 399/49 |
| 2007/0139664 | A1 * | 6/2007 | Kitamura et al. | 358/1.4 |

FOREIGN PATENT DOCUMENTS

| | | | |
|---|---|---|---|
| JP | 07-230211 | A | 8/1995 |
| JP | 11-202571 | A | 7/1999 |
| JP | 2001-272831 | A | 10/2001 |
| JP | 2002-341699 | A | 11/2002 |
| JP | 2003-215904 | A | 7/2003 |

* cited by examiner

IMAGE FORMING APPARATUS, CONTROLLING UNIT, IMAGE FORMING METHOD AND COMPUTER READABLE MEDIUM

CROSS REFERENCE TO RELATED APPLICATIONS

This application is based on and claims priority under 35 USC §119 from Japanese Patent Application No. 2007-000606 filed Jan. 5, 2007.

BACKGROUND

1. Technical Field

The present invention relates to an image forming apparatus, a controlling unit, an image forming method and a computer readable medium storing a program.

2. Related Art

There is an image forming apparatus that changes an image forming process speed.

An object of the present invention is to obtain stable quality of an image printed at each level of a process speed when the process speed is changed.

SUMMARY

According to an aspect of the invention, there is provided an image forming apparatus including: an image forming unit that forms an image on a medium; a speed changing unit that changes an image forming speed of the image forming unit; a detecting unit that detects a state quantity indicating a state of the image on the medium formed by the image forming unit; and an adjusting unit that adjusts an image forming condition set by the image forming unit according to a detection result of the state quantity detected by the detecting unit and a target value for the state quantity.

The adjusting unit changes the target value for the state quantity according to the state quantity detected by the detecting unit after the speed changing unit changes the image forming speed.

BRIEF DESCRIPTION OF THE DRAWINGS

Exemplary embodiment (s) of the present invention will be described in detail based on the following figures, wherein.

DETAILED DESCRIPTION

Hereinafter, exemplary embodiments of the present invention will be described in detail with reference to the accompanying drawings.

First Exemplary Embodiment

Figure 1:
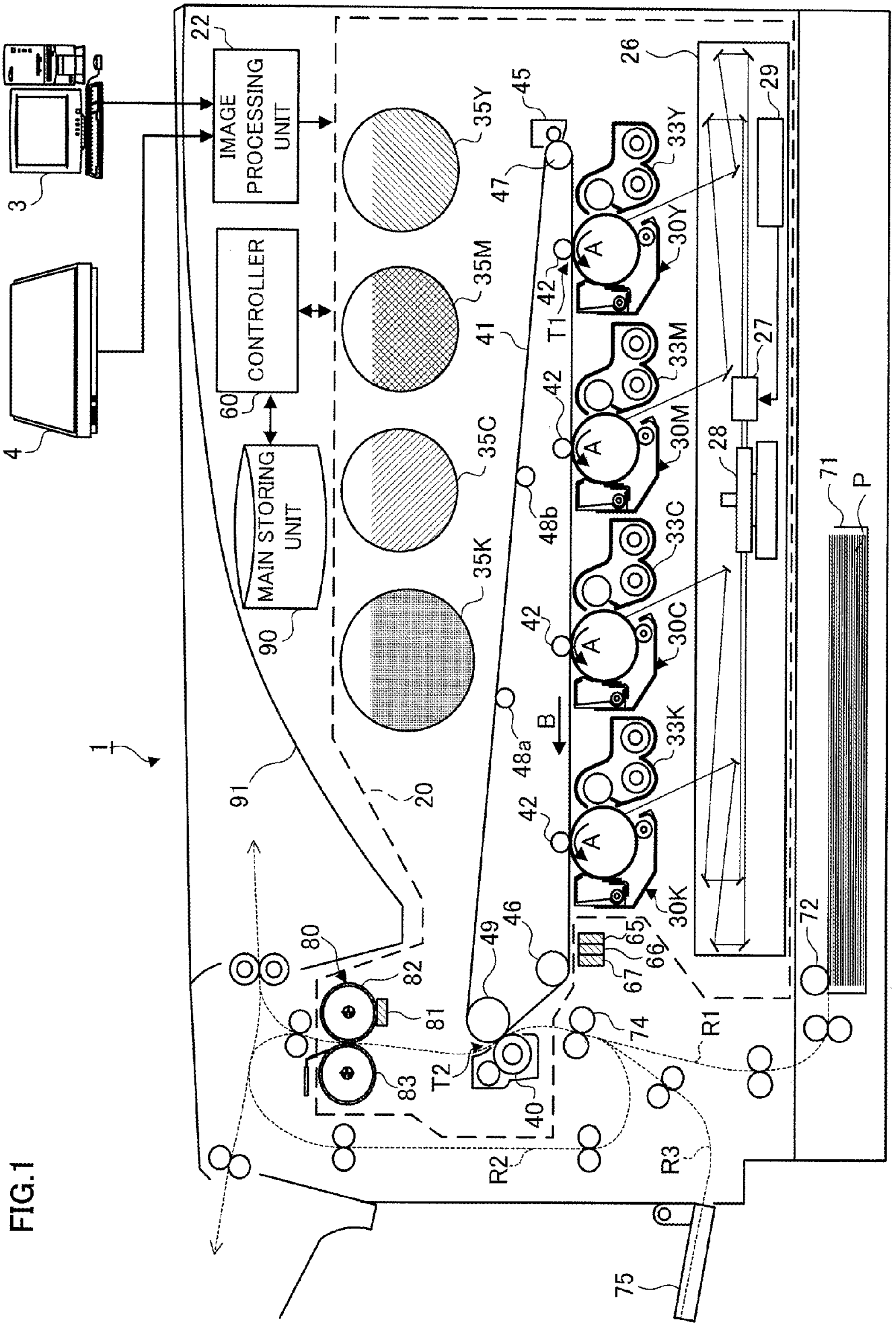
FIG. 1 is a diagram showing a configuration example of an image forming apparatus to which a first exemplary embodiment is applied.

FIG. 1 is a diagram showing a configuration example of an image forming apparatus to which the first exemplary embodiment of the present invention is applied. An image forming apparatus 1 shown in FIG. 1 is what is termed as a tandem-type digital color printer with an image forming method of electrophotography as an example of an image forming unit, and includes an image-formation process unit 20, a controller 60, an image processing unit 22 and a main storing unit 90. Specifically, the image-formation process unit 20 forms an image in response to image data of each color by use of an electrophotographic image forming method that is one of image forming methods for forming images. The controller 60 controls the entire operations of the image forming apparatus 1. The image processing unit 22 performs certain image processing on image data received, for example, from a personal computer (PC) 3, an image capturing apparatus 4 such as a scanner and the like. The main storing unit 90 is constructed, for example, in a hard disk (hard disk drive) on which processing programs and the like are recorded.

Moreover, the image forming apparatus 1 also includes a reference density detection sensor 55, a humidity sensor 66 that detects the humidity inside the apparatus (internal humidity), and a temperature sensor 67 that detects the temperature inside the apparatus (internal temperature). The reference density detection sensor 55 is an example of a detecting unit that detects a toner image density, which is an example of state quantities, that is, the toner image density of each of reference density patterns made of toner images of each color formed on an intermediate transfer belt 41, which will be described later.

The image-formation process unit 20 includes four image forming units 30Y, 30M, 30C and 30K (each of the four image forming units 30Y, 30M, 30C and 30K is also referred to as an image forming unit 30 with no distinction in the colors) arranged in parallel at certain intervals. The image forming unit 30 is an example of a toner image forming unit that forms toner images of each of yellow (Y), magenta (M), cyan (C) and black (K).

Figure 2:
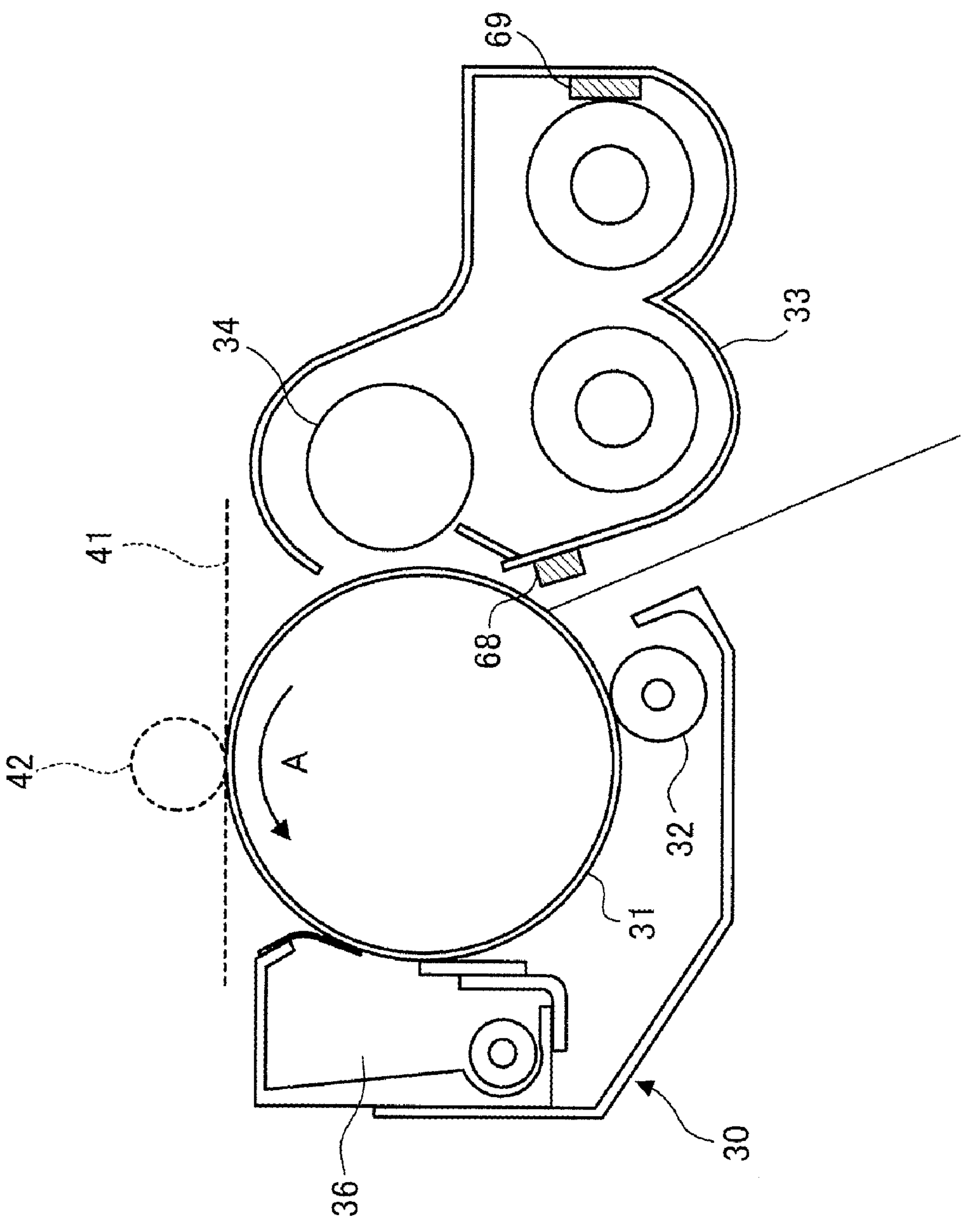
FIG. 2 is a diagram showing a configuration example of the image forming unit.

Here, FIG. 2 is a diagram showing a configuration example of the image forming unit 30. As shown in FIG. 2, the image forming unit 30 includes a photosensitive drum 31, a charging roll 32, a developing unit 33 and a drum cleaner 36. The photosensitive drum 31 is an example of an image carrier that has an electrostatic latent image formed thereon while rotating in a direction of an arrow A. The charging roll 32 is an example of a charging unit that uniformly charges the surface of the photosensitive drum 31 at a certain electric potential. The developing unit 33 is an example of a developing unit that develops electrostatic latent images formed on the photosensitive drum 31. The drum cleaner 36 cleans the surface of the photosensitive drum 31 after the first transfer.

The charging roll 32 is configured of a roll member having a conductive elastic layer and a conductive surface layer sequentially stacked on a conductive core bar made of aluminum, stainless steel or the like. The charging roll 32 is supplied with a charge bias voltage from a charge power source (not illustrated), and charges the surface of the photosensitive drum 31 while being driven to rotate by the photosensitive drum 31. Here, the value of the charge bias voltage supplied from the charge power source is set according to a control signal from the controller 60.

The developing unit 33 is configured as a developing unit 33Y, 33M, 33C or 33K that develops a toner of yellow (Y), magenta (M), cyan (C) or black (K) in each of the image forming units 30. Each of the developing units 33 holds, on a developing roll 34, a two-component developer composed of a color toner and magnetic carrier, and develops electrostatic latent images on the photosensitive drum 31 by applying a direct voltage or a developing bias voltage to the developing roll 34. Here, the developing bias voltage is obtained by superimposing a direct voltage on an alternating voltage.

The developing units 33 are configured to be connected via toner conveyance paths (not illustrated) to toner containers 35Y, 35M, 35C and 35K, respectively, that store toners of the respective colors, and to be refilled with the toners by refill screws (not illustrated) provided in the toner conveyance paths. In addition, the developing unit 33 is provided therein with a toner density sensor 69 that detects a blend ratio (toner density) between the toner and the magnetic carrier in the two-component developer by checking, for example, a change of the magnetic permeability of the two-component developer. The toner density sensor 69 detects the toner density of the two-component developer and transmits the detection value (toner density detection value) to the controller 60. The controller 60 controls an operation of the refill screw inside the toner conveyance path according to the obtained toner density detection value. With this control, the amounts of the respective color toners refilled from the toner containers 35Y, 35M, 35C and 35K to the respective developing units 33 are adjusted and thus the toner densities inside the developing units 33 are controlled.

Moreover, downstream of the charging roll 32 in the rotation direction of the photosensitive drum 31, the image forming unit 30 includes a potential sensor 68 that detects the surface potential on the photosensitive drum 31. The potential sensor 68 detects the surface potential of the photosensitive drum 31, and transmits the detection value (surface potential detection value) to the controller 60. The controller 60 controls the surface potential of the photosensitive drum 31 according to the obtained surface potential detection value. It should be noted that the controller 60 and the potential sensor 68 are examples of a potential detecting unit.

In addition, the image-formation process unit 20 includes a laser-exposure unit 26, an intermediate transfer belt 41, first transfer rolls 42, a second transfer roll 40 and a fixing unit 80. The laser-exposure unit 26 exposes each of the photosensitive drums 31 provided with the respective image forming units 30. The intermediate transfer belt 41 receives a multi-transfer of toner images of the respective colors formed on the photosensitive drums 31 of the image forming units 30. The first transfer rolls 42 sequentially transfer the respective color toner images of the image forming units 30 to the intermediate transfer belt 41 at first transfer portions T1 (first-transfer). The second transfer roll 40 collectively transfers the superimposed toner images transferred on the intermediate transfer belt 41 to a paper sheet P that is a recording material (recording paper) at a second transfer portion T2 (second-transfer). The fixing unit 80 fixes the second-transferred image on the paper sheet P.

The laser-exposure unit 26 includes a semiconductor laser 27 as a light source, a scanning optical system (not illustrated) that scans and exposes the photosensitive drum 31 with laser light, a rotating polygon mirror (polygon mirror) 28 formed, for example, in a regular hexahedron, and a laser driver 29 that controls the driving of the semiconductor laser 27. The laser driver 29 receives an input of image data from the image processing unit 22, and a light amount control signal and the like from the controller 60, and controls the lighting-up, the output light amount and the like of the semiconductor laser 27.

The first transfer rolls 42 and the second transfer roll 40 are each configured of a roll member having a conductive elastic layer and a conductive surface layer sequentially stacked on a conductive core bar made of aluminum, stainless steel or the like. The first transfer rolls 42 are each supplied with a first transfer bias voltage from a first transfer power source (not illustrated) and transfer the toner images onto the intermediate transfer belt 41. In addition, the second transfer roll 40 is supplied with a second transfer bias voltage from a second transfer power source (not illustrated), and transfers the toner image onto the paper sheet P. Here, the values of the first and second bias voltages supplied from the first and second transfer power sources, respectively, are set according to control signals from the controller 60.

The fixing unit 80 includes a fixing roll 82 internally having a heat source, a pressing roll 83 that is arranged to press the fixing roll 82, and a temperature sensor 81 that detects the surface temperature of the fixing roll 82. The fixing unit 80 causes the paper sheet P having a not-fixed toner image thereon to pass between the fixing roll 82 and the pressing roll 83 while heating up and pressurizing the not-fixed toner image, and thereby fixes the toner image on the paper sheet P. At this time, the temperature sensor 81 detects the surface temperature of the fixing roll 82, and transmits the detection value (surface temperature detection value) to the controller 60. According to the obtained surface temperature detection value, the controller 60 sets an output value from a fixing power source (not illustrated) that supplies a current to the heat source of the fixing roll 82, and thereby controls the surface temperature of the fixing roll 82. Moreover, the fixing unit 80 controls a speed of conveying the paper sheet P according to a control signal from the controller 60.

In the image forming apparatus 1 having the above-mentioned configuration according to the first exemplary embodiment, the image-formation process unit 20 performs image forming operations under control of the controller 60. To be more precise, the image data inputted from the PC 3, the image capturing apparatus 4 or the like is subjected to certain image processing by the image processing unit 22, and then provided to the laser-exposure unit 26. Thereafter, for example, in the image forming unit 30Y of yellow (Y), the electrostatic latent image is formed on the photosensitive drum 31 in the following way. Firstly, the charging roll 32 uniformly charges the surface of photosensitive drum 31 at the certain potential. Then, the laser-exposure unit 26 scans and exposes the charged surface of the photosensitive drum 31 with laser light whose lighting operation is controlled according to the image data from the image processing unit 22. The formed electrostatic latent image is developed by the developing unit 33Y, and thereby the yellow (Y) toner image is formed on the photosensitive drum 31. In the image forming units 30M, 30C and 30K, the respective color toner images of magenta (M), cyan (C) and black (K) are also formed in the same way.

The color toner images of the respective image forming units 30 are electrostatically transferred on the intermediate transfer belt 41 by the first transfer rolls 42, one by one, and thereby form the superposed toner images on the intermediate transfer belt 41. At this time, the intermediate transfer belt 41 circularly moves in an arrow B direction in FIG. 1, and the certain first transfer bias voltage is applied to the first transfer roll 42 by the transfer power source (not illustrated). The superimposed toner images are conveyed with the movement of the intermediate transfer belt 41 toward the second transfer portion T2 where the second transfer roll 40 and a backup roll 49 are arranged. On the other hand, the paper sheets P are taken out from a paper holding unit 71 by a pickup roll 72, and conveyed one by one along a conveyance route R1 to the position of resist rolls 74.

When the superimposed toner images are conveyed to the second transfer portion T2, the paper sheet P is supplied to the second transfer portion T2 from the resist roll 74 at a timing when the toner images just arrive at the second transfer portion T2. Then, at the second transfer portion T2, the superimposed toner images are collectively and electrostatically transferred (second-transferred) on the paper sheet P by action of a transfer field formed between the backup roll 49 and the second transfer roll 40 having the second transfer bias voltage applied thereto.

Incidentally, the paper sheet P is also conveyed to the second transfer portion T2 via a conveyance route R2 for both side printing or a conveyance route R3 from a paper holding unit 75 for manual paper feeding.

After that, the paper sheet P having superimposed toner images electrostatically transferred thereon is separated from the intermediate transfer belt 41 and conveyed to the fixing unit 80. The not-fixed toner image on the paper sheet P conveyed to the fixing unit 80 is subjected to fixing processing with a heat and a pressure by the fixing unit 80, and thereby is fixed on the paper sheet P. Then, the paper sheet P having the fixed image formed thereon is conveyed to a paper stack unit 91 provided at a discharge portion of the image forming apparatus 1. Meanwhile, the toner (transfer residual toner) attached to the intermediate transfer belt 41 after the second-transfer is removed by a belt cleaner 45 that is in contact with the intermediate transfer belt 41, and is made ready for the next image forming cycle.

In this way, the image formation in the image forming apparatus 1 is repeatedly executed for a designated number of paper sheets.

Here, the image forming apparatus 1 according to the first exemplary embodiment is configured to select one of multiple image forming modes according to a kind of paper sheet P, a required resolution and the like. The multiple image forming modes allow different process speeds PS to be set. For example, a first process speed PS1 (for example, 104 mm/sec) is set in a "plain-paper mode" using plain paper (for example, a basic weight of 64 g/m$^2$) as the paper sheet P, and a second process speed PS2 (for example, 52 mm/sec) is set in a "thick-paper mode" using thick paper (for example, a basic weight of 108 g/m$^2$) or an OHP sheet as the paper sheet P. This switching (change) between the process speeds PS is carried out by the controller 60 that also functions as a speed changing unit and a speed information obtaining unit in the first exemplary embodiment.

Moreover, the image forming apparatus 1 of the first exemplary embodiment performs "setup processing" at a start time and an end time of image formation, and at certain intervals, such as every certain number of printed sheets, during image forming operations. The setup processing here is performed to obtain the high quality of images formed by the image forming apparatus 1 constantly. More precisely, in the setup processing, a setting value of each image forming factor (also referred to as an "image forming condition" below) is appropriately changed by using a state quantity indicating the state of an image formed by each of the image forming units 30, thereby adjusting the densities (image densities) and tones of the image. Usable setting values of the image forming factors determining image quality are the value of the output light amount of the semiconductor laser 27 in the laser-exposure unit 26, the value of the charge bias voltage supplied to the charging roll 32 and the like. This setup processing is performed under control of the controller 60 that also functions as an adjusting unit in the first exemplary embodiment.

An example of the setup processing performed by the image forming apparatus 1 of the first exemplary embodiment will be described.

Firstly, the controller 60 sets the surface potential of the photosensitive drum 31 in each of the image forming units 30 at two levels, that is, a high potential level and a low potential level, sequentially. At this time, each of various image forming conditions such as the output light amount value of the semiconductor laser 27, the developing bias voltage value for the developing roll 34, and the first transfer bias voltage value for the first transfer roll 42 is set to a certain value. Then, the image forming units 30 each generates multiple reference density patterns having different area ratios (tones) at each of the potential levels.

Figure 3:
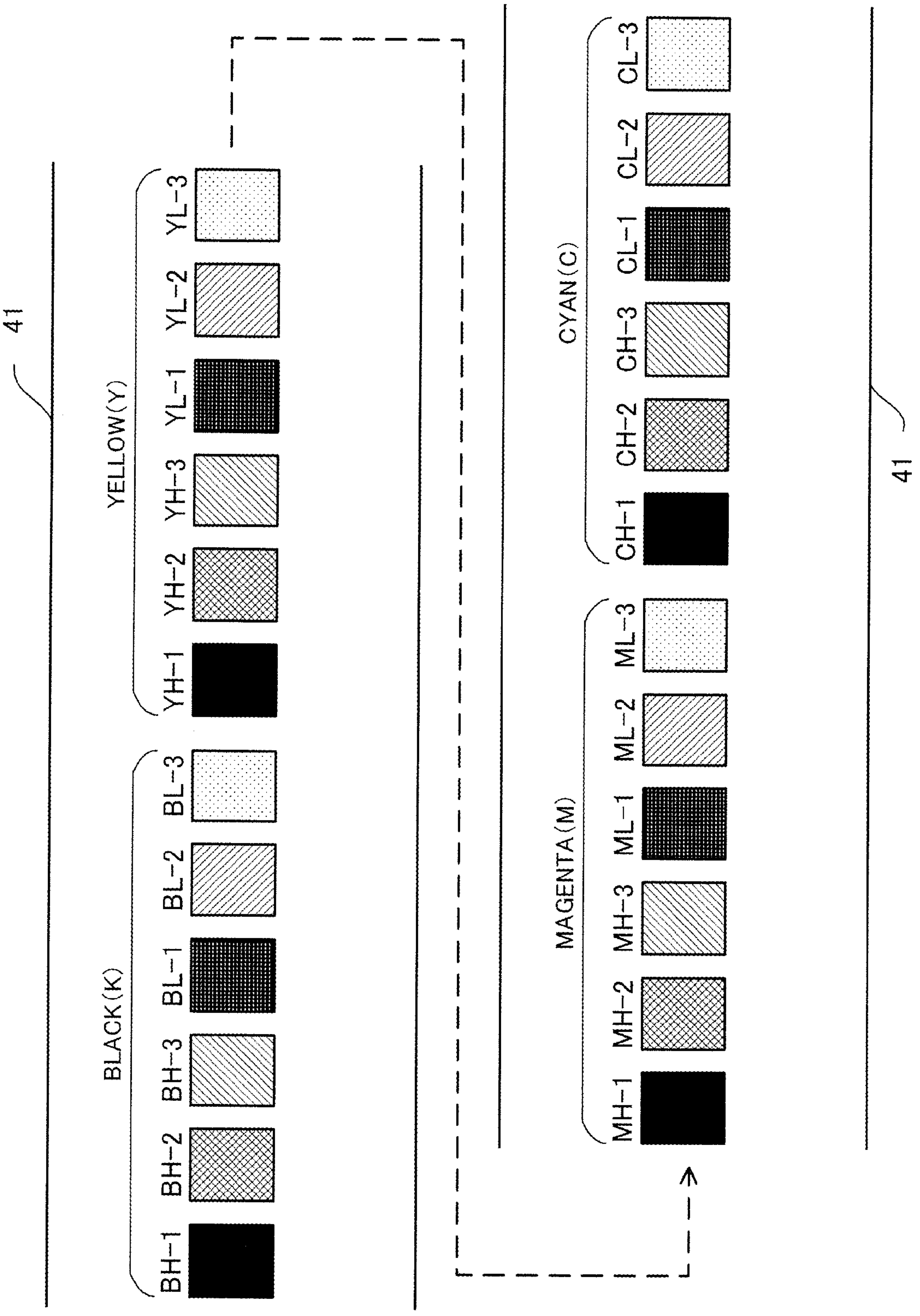
FIG. 3 is a diagram showing the multiple reference density patterns of different tones generated by each of the image forming units and first-transferred on the intermediate transfer belt.

Here, FIG. 3 is a diagram showing the multiple reference density patterns of different tones generated by each of the image forming units 30 and first-transferred on the intermediate transfer belt 41. The example shown in FIG. 3 shows the case where the image forming unit 30K of black (K), for example, forms three reference density patterns BH-1, BH-2 and BH-3 of three tones at the high potential level and three reference density patterns BL-1, BL-2 and BL-3 of three tones at the low potential level. Accordingly, the image forming unit 30K forms the six reference density patterns of six tones in total. Likewise, the image forming unit 30Y of yellow (Y) forms reference density patterns YH-1, YH-2 and YH-3 as well as YL-1, YL-2 and YL-3, the image forming unit 30M of magenta (M) forms reference density patterns MH-1, MH-2 and MH-3 as well as ML-1, ML-2 and ML-3, and the image forming unit 30C of cyan (C) form reference density patterns CH-1, CH-2 and CH-3 as well as CL-1, CL-2 and CL-3.

The densities of the respective reference density patterns for each color formed as the example shown in FIG. 3 are detected by the reference density detection sensor 55 arranged downstream of the image forming unit 30K in the moving direction of the intermediate transfer belt 41. Then, the detected density values of the reference density patterns for each color are transmitted to the controller 60 as the state quantities each indicating the state of an image formed by each of the image forming units 30. Similarly, the detection value of the internal humidity (detected humidity value) detected by the humidity sensor 66 and the detection value of the internal temperature (detected temperature value) detected by the temperature sensor 67 are also transmitted to the controller 60.

Then, the controller 60 sets the various image forming conditions according to the detected density values of the reference density patterns for each color, the detected humidity value and the detected temperature value, and thereby adjusts the image densities and tones so that the high image quality would be maintained. The controller 60 here functions as a state quantity obtaining unit in the first exemplary embodiment.

Figure 4:
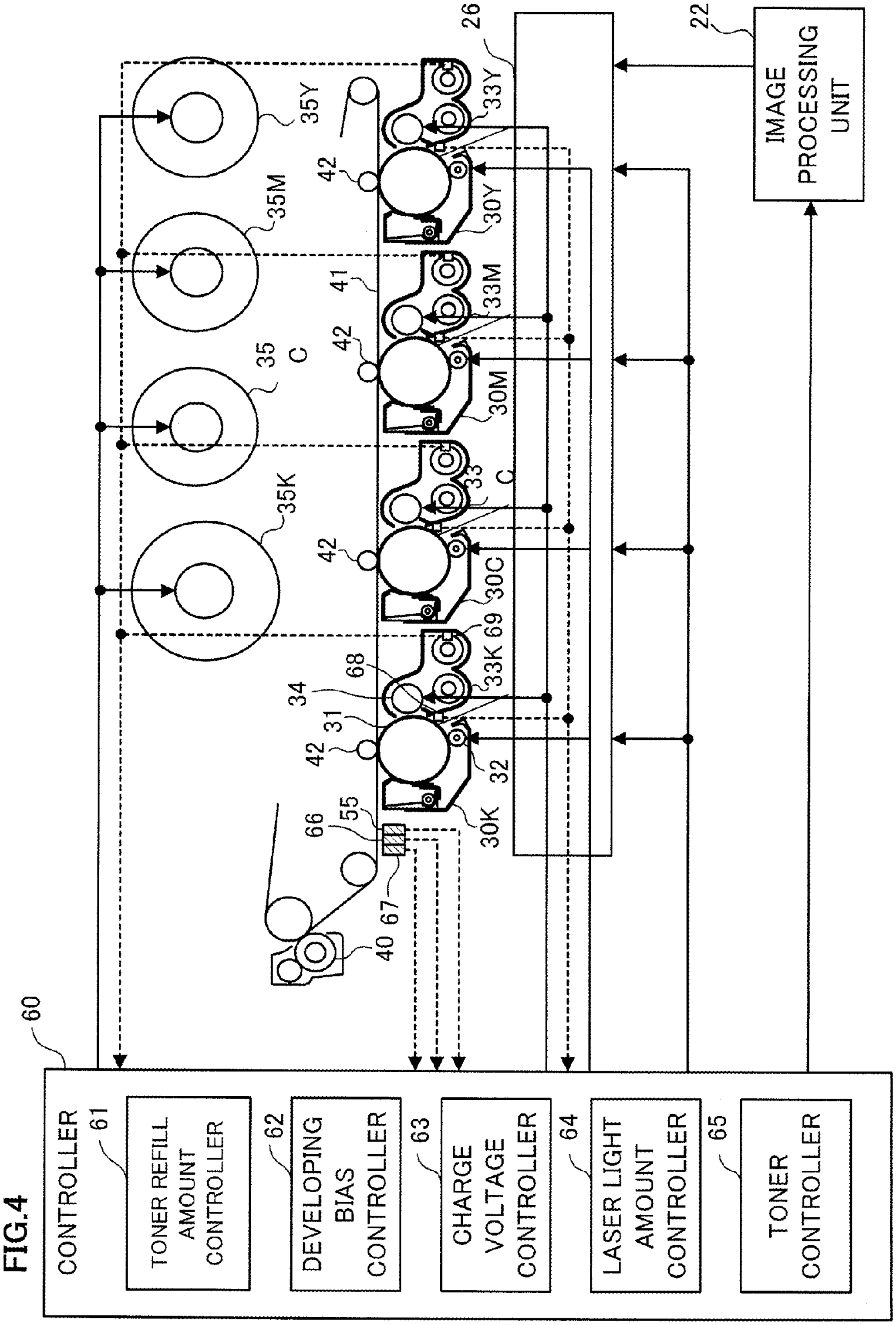
FIG. 4 is a block diagram explaining a functional configuration that performs the setup processing in the controller in the first exemplary embodiment.

Here, FIG. 4 is a block diagram explaining a functional configuration that performs the setup processing in the controller 60 in the first exemplary embodiment. As shown in FIG. 4, the controller 60 includes, as functional units that perform the setup processing, a toner refill amount controller 61, a developing bias controller 62, a charge voltage controller 63, a laser light amount controller 64 and a tone controller 65. The detected density values of the reference density patterns for each color of the reference density detection sensor 55, the detected humidity value of the humidity sensor 66, the detected temperature value of the temperature sensor 67 and the like are transmitted to the toner refill amount controller 61, the developing bias controller 62, the charge voltage controller 63, the laser light amount controller 64 and the tone controller 65.

Figure 5:
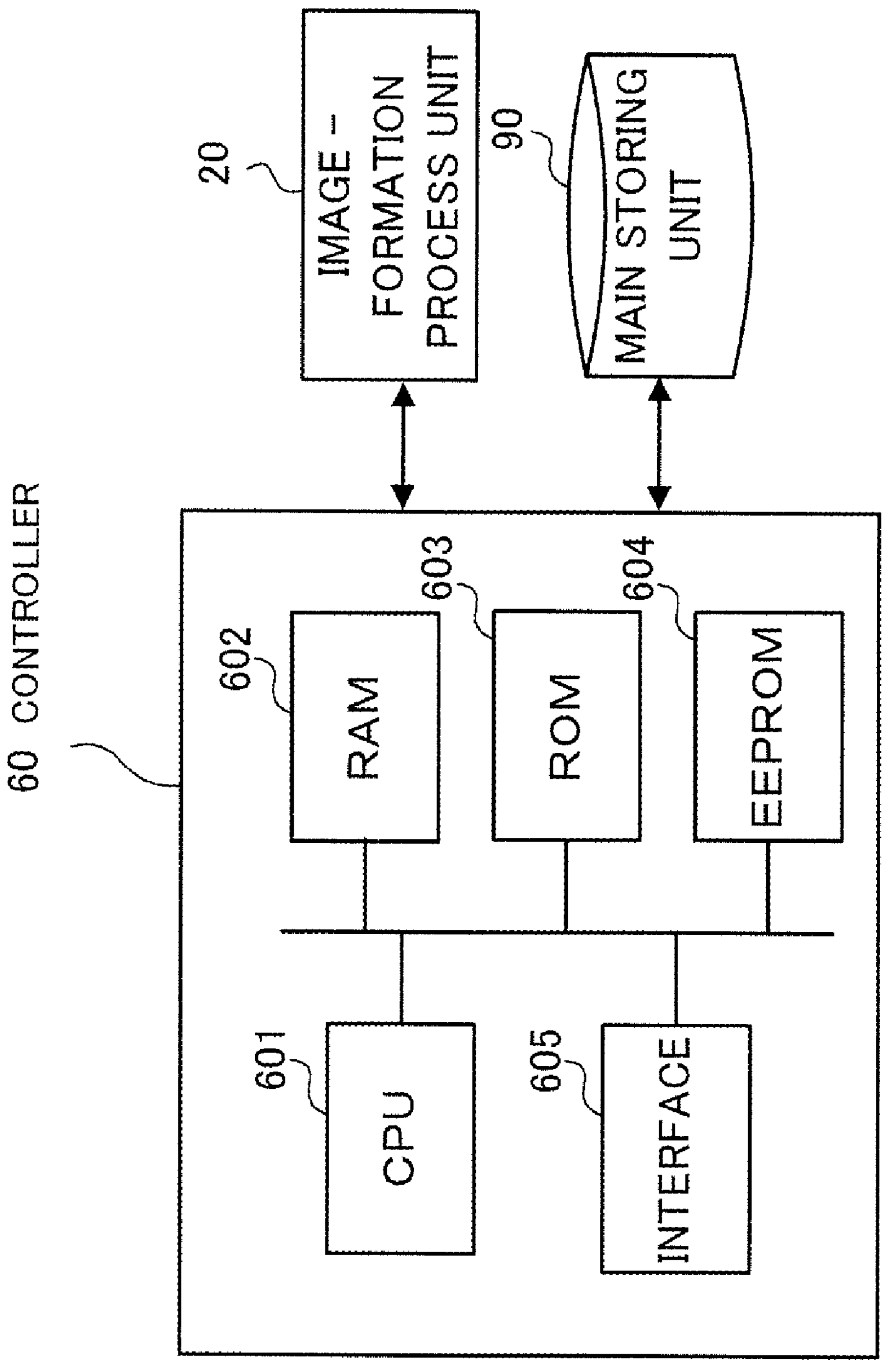
FIG. 5 is a block diagram showing an internal configuration of the controller of the first exemplary embodiment.

In addition, FIG. 5 is a block diagram showing an internal configuration of the controller 60 of the first exemplary embodiment. As shown in FIG. 5, the controller 60 includes a CPU (central processing unit) 601, a RAM (random access memory) 602, a ROM (read-only memory) 603, an EEPROM (electronically erasable and programmable read only memory) 604 and an interface 605. The CPU 601 executes digital arithmetic processing in accordance with a processing program when performing the setup processing. The RAM 602 is used as a storing unit or the like for the operation of the CPU 601. In the ROM 603, the processing program and the like to be executed by the CPU 601 are stored. The EEPROM 604 is an example of a storing unit that is rewritable and capable of holding data even when the power supply is stopped. The interface 605 controls input and output of signals to and from each unit connected to the controller 60, such as the image-formation process unit 20, the main storing unit 90 and the reference density detection sensor 55.

The CPU 601 of the controller 60 performs various kinds of processing by reading, from the main storing unit 90 to the RAM 602 or the like, a program for implementing the functions of the toner refill amount controller 61, the developing bias controller 62, the charge voltage controller 63, the laser light amount controller 64 and the tone controller 65. In addition, a table (for example, a charge bias voltage table) provided to each functional unit, to be described later, is prestored in the EEPROM 604 of the controller 60.

In addition, the processing program to be executed by the controller 60 is stored in the main storing unit 90. Hence, the controller 60 reads the processing program at a start-up time of the image forming apparatus 1, and thereby executes the setup processing of the first exemplary embodiment.

The laser light amount controller 64 is provided with an output light amount table determining correspondences of the output light amount with each of the detected density values (or a difference between the detected density value and its target value), the detected humidity value and the detected temperature value. According to this output light amount table, the laser light amount controller 64 controls the value of the output light amount that the semiconductor laser 27 emits from the laser-exposure unit 26 to the photosensitive drum 31. The charge voltage controller 63 is provided with a charge bias voltage table determining correspondences of the charge bias voltage value with the each of the detected density values (or the difference between the detected density value and its target value), the detected humidity value and the detected temperature value. According to this charge bias voltage table, the charge voltage controller 63 controls the value of the charge bias voltage supplied to each of the charging rolls 32 of the respective image forming units 30. The developing bias controller 62 is provided with a developing bias voltage table determining correspondences of the developing bias voltage value with each of the detected density values (or the difference between the detected density value and its target value), the detected humidity value and the detected temperature value. According to this developing bias voltage table, the developing bias controller 62 controls the value of the developing bias voltage applied to the developing roll 34. The toner refill amount controller 61 is provided with a toner density table determining correspondences of the toner density with each of the detected density values (or the difference between the detected density value and its target value), the detected humidity value and the detected temperature value. According to this toner density table, the toner refill amount controller 61 controls, if needed, the toner refill amounts of the respective colors refilled in the respective developing units 33 by the toner containers 35Y, 35M, 35C and 35K.

Moreover, the tone controller 65 generates tone control signals based on the detected density values of the reference density detection sensor 55, and outputs the tone control signals to the image processing unit 22. The image processing unit 22 is provided with a lookup table (LUT) for changing the area ratios of inputted image data according to the tone control signals. Thus, the image processing unit 22 changes the area ratios of the inputted image data by referring to the LUT according to the tone control signals, and transmits the resultant image data to the laser-exposure unit 26.

It should be noted that the controller 60 of the first exemplary embodiment is configured to control, as the image forming conditions, the value of the output light amount of the semiconductor laser 27 in the laser-exposure unit 26, the value of the charge bias voltage supplied to the charging roll 32 and the value of the developing bias voltage applied to the developing roll 34, and also, if necessary, the toner refill amounts of colors refilled in the respective developing units 33, when performing the setup processing. However, the controller 60 may also be configured to control the surface temperature and the fixing speed of the fixing roll 82 in the fixing unit 80, and the value of the first transfer bias voltage applied to the first transfer roll 42 in addition to the aforementioned values, and to change the lookup table (LUT) that is provided to the image processing unit 22 and used corresponding to the tone control signals.

Hereinafter, descriptions will be provided for the setup processing performed by the controller 60 when the process speed PS is changed.

The image forming apparatus 1 of the first exemplary embodiment has a function with which, when the process speed PS is changed, the setup processing for the process speed PS after the change is performed by using, as a target value for an image density, each of the detected density values of the reference density patterns for each color, which density values are detected for the first time after the process speed PS is changed.

Figure 6:
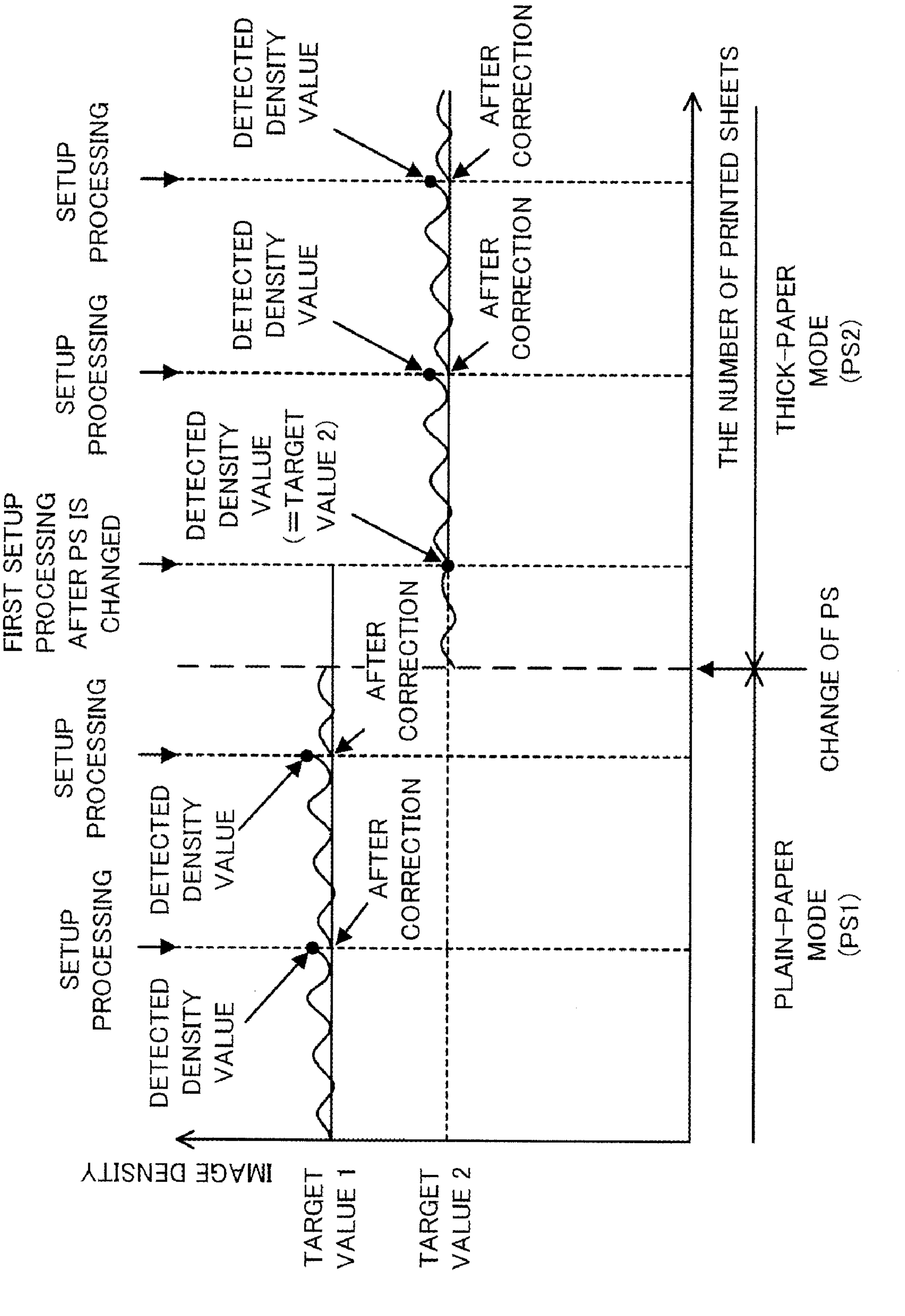
FIG. 6 is a diagram explaining the target value of the image density set in the setup processing after the process speed is changed.

FIG. 6 is a diagram explaining the target value of the image density set in the setup processing after the process speed PS is changed. The example in FIG. 6 shows the case where the first process speed PS1 initially set by setting the plain-paper mode is changed to the second process speed PS2 by setting the thick-paper mode. In addition, the setup processing is performed every certain number of printed sheets, which will be described later.

As shown in FIG. 6, in the plain-paper mode of the first process speed PS1 that is set initially, the following setup processing is performed. Specifically, the target value 1 for each of the image densities in the plain-paper mode is previously set in the controller 60, and the controller 60 compares the target value 1 with the detected density value of each color reference density pattern that is detected by the reference density detection sensor 55. More specifically, the controller 60 previously stores the target values 1 in the EEPROM 604 inside the controller 60. Then, according to the result of comparison of the detected density value with the target value 1 in terms of the image density, and also according to the detected humidity value and the detected temperature value, the controller 60 controls the output light amount value of the semiconductor laser 27, the charge bias voltage value and the developing bias voltage value so that the image density would be the target value 1.

It should be noted that the target value 1 here for the image density is an example of the target value of the state quantity.

Then, the thick-paper mode is set and thereby the process speed PS is changed. In this case, the following setup processing is performed in the first setup processing after the process speed PS is changed to the second the process speed PS2. Specifically, the controller 60 sets, as a target value for each of the image densities (target value 2), the detected density value of a corresponding one of the color reference density patterns in the first setup processing. In other words, the controller 60 stores the target value 2 in the EEPROM 604 inside the controller 60 when this first setup processing is performed. Subsequently, the output light amount value of the semiconductor laser 27, the charge bias voltage value and the developing bias voltage value are set when the image density is set to the target value 2. Thereafter, in the subsequent setup processing in the thick-paper mode, the controller 60 compares the target value 2 with the detected density value of each color reference density pattern that is detected by the reference density detection sensor 55.

Then, according to the result of comparison of the detected density value with the target value 2 in terms of the image density, and also according to the detected humidity value and the detected temperature value, the output light amount value of the semiconductor laser 27, the charge bias voltage value and the developing bias voltage value are controlled so that the image density would be the target value 2.

It should be noted that the target value 2 here for the image density is an example of the target value of the state quantity.

As described above, when the process speed PS is changed as a result of the change in the image forming mode setting, the image forming apparatus 1 of the first exemplary embodiment sets, as the target value for each of the image densities at the newly-set process speed PS, the detected density value of a corresponding one of the color reference density patterns that is detected in the first setup processing at the newly-set process speed PS. This reduces a variation in image density at the same process speed PS.

In general, when the process speed PS is changed, the image density also varies. Meanwhile, the setup processing is performed at certain intervals. Accordingly, the image density is not modified until the first setup processing after the change of the process speed PS is performed. For this reason, an image formed after the change of the process speed PS and before the execution of the next setup processing has a different level of image density from a level of image density of an image formed before the change of the process speed PS.

Thereafter, in the case where the target value for the image density set before the change of the process speed PS is used without any modification in the first setup processing after the change of the process speed PS like a conventional manner, the image density is modified to the original image density level. However, the image density again varies at the first setup processing after the change of the process speed PS.

In the conventional setup processing as described above, the image density before the change of the process speed PS and the image density modified in the first setup processing after the change of the process speed PS are substantially equalized to each other. However, the image density after the first setup processing is different from the image density before the first setup processing in the image forming mode after the change of the process speed PS. This generates a variation in color between the images formed in the same image forming mode, and thereby causes a problem for a user.

In contrast to this, in the case of the image forming apparatus 1 of the first exemplary embodiment, even while the image density varies between the two types of paper sheets, the variation in image density in the same image forming mode is reduced. When a type of paper sheets P is changed to another type, images formed on the two types of paper sheets are usually used for different purposes. For this reason, it is a rare case that a variation in image density between the two types of paper sheets is considered as a serious problem. In addition, even when different paper sheets P are used for the same purpose, the density variation between the different paper sheets P makes a less impact on the visual impression of a user than the density variation between the same paper sheets P. Hence, the image forming apparatus 1 of the first exemplary embodiment performs the setup processing that sets a variation in the image density in the same image forming mode to be reduced.

In addition, in order to solve the above-mentioned problem of the conventional setup processing, the setup processing may be performed every time the process speed PS is changed. However, the setup processing requires the processing of forming the reference density patterns as shown in FIG. 3, detecting the densities of the patterns for each color by the reference density detection sensor 55, and then changing the settings of the various image forming conditions by use of the image forming factors. Thereby, the setup processing requires a certain period of time. As a result, when the image forming mode is changed frequently, the setup processing for every change causes another problem of lowering the productivity of image formation. In contrast, in the case of the image forming apparatus 1 of the first exemplary embodiment, the interval for the setup processing is not changed from the interval set in advance as every certain number of printed sheets. Consequently, the productivity of image formation is maintained.

Hereinafter, descriptions will be provided for a procedure of the setup processing performed by the controller 60.

Here, as is similar to the above-mentioned descriptions, the first and second process speeds PS1 and PS2 are set in the plain-paper mode and the thick-paper mode, respectively. Moreover, the controller 60 includes individual sheet-number counters CNT1 and CNT2 as counters that each measure the number of printed sheets. The sheet-number counter CNT1 measures the cumulative number of printed sheets after the last setup processing when the first process speed PS1 is set.

The sheet-number counter CNT2 measures the cumulative number of printed sheets after the last setup processing when the second process speed PS2 is set. Moreover, the descriptions will be provided by taking as an example the output light amount value of the semiconductor laser 27 for the image forming condition whose setting is to be changed. However, the settings of the other image forming conditions such as the charge bias voltage value and the developing bias voltage value are also changed similarly as needed.

In the image forming apparatus 1 of the first exemplary embodiment, the setup processing is set to be performed when the value of the cumulative number of printed sheets measured by the sheet-number counter CNT1 or CNT2 exceeds a certain number of printed sheets determined for the process speed PS1 or PS2, that is, after a certain interval.

Figure 7:
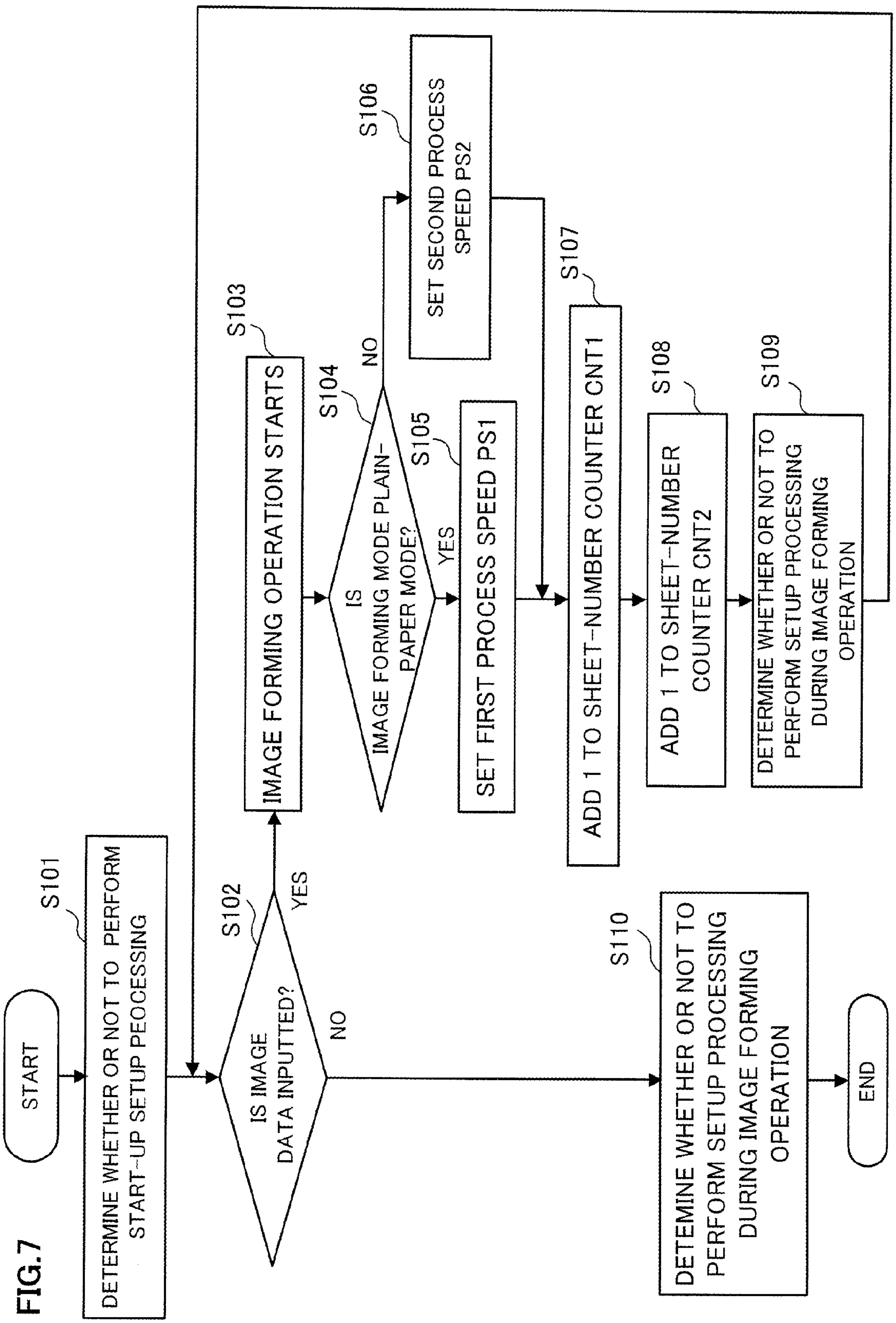
FIG. 7 is a flowchart showing an overall flow of the processing in which the controller determines whether or not to perform the setup processing.

FIG. 7 is a flowchart showing an overall flow of the processing in which the controller 60 determines whether or not to perform the setup processing. As shown in FIG. 7, when a main switch of the image forming apparatus 1 is turned on, the controller 60 determines whether or not to perform setup processing (start-up setup processing) for starting up the image forming apparatus 1 (S101). It should be noted that the start-up setup processing will be described later by using subsequent FIG. 8.

Next, when image data to be printed is inputted (S102), the image forming operation starts (S103). Then, the controller 60 determines the set image forming mode (S104). When the controller 60 determines that the plain-paper mode is set in step 104, the controller 60 sets the first process speed PS1 (S105). Instead, when the controller 60 determines that the thick-paper mode is set in step 104, the controller 60 sets the second process speed PS2 (S106).

When the first process speed PS1 is set, the controller 60 adds one (1) to the count value of the sheet-number counter CNT1 on every cycle of the image forming operation (S107). Instead, when the second process speed PS2 is set, the controller 60 adds one (1) to the count value of the sheet-number counter CNT2 on every cycle of the image forming operation (S108). Thereafter, the controller 60 determines whether or not to perform the setup processing during the image forming operation of the image forming apparatus 1 (S109). The controller 60 repeats the determination processing until the image data input ends. It should be noted that the setup processing during image forming operation will be described by using subsequent FIG. 9.

Then, when the input of the image data to be printed ends (S102), the controller 60 determines whether or not to perform setup processing at a time of ending the image forming operation (ending setup processing) (S110). It should be noted that the ending setup processing will be described later by using subsequent FIG. 9.

Figure 8A:
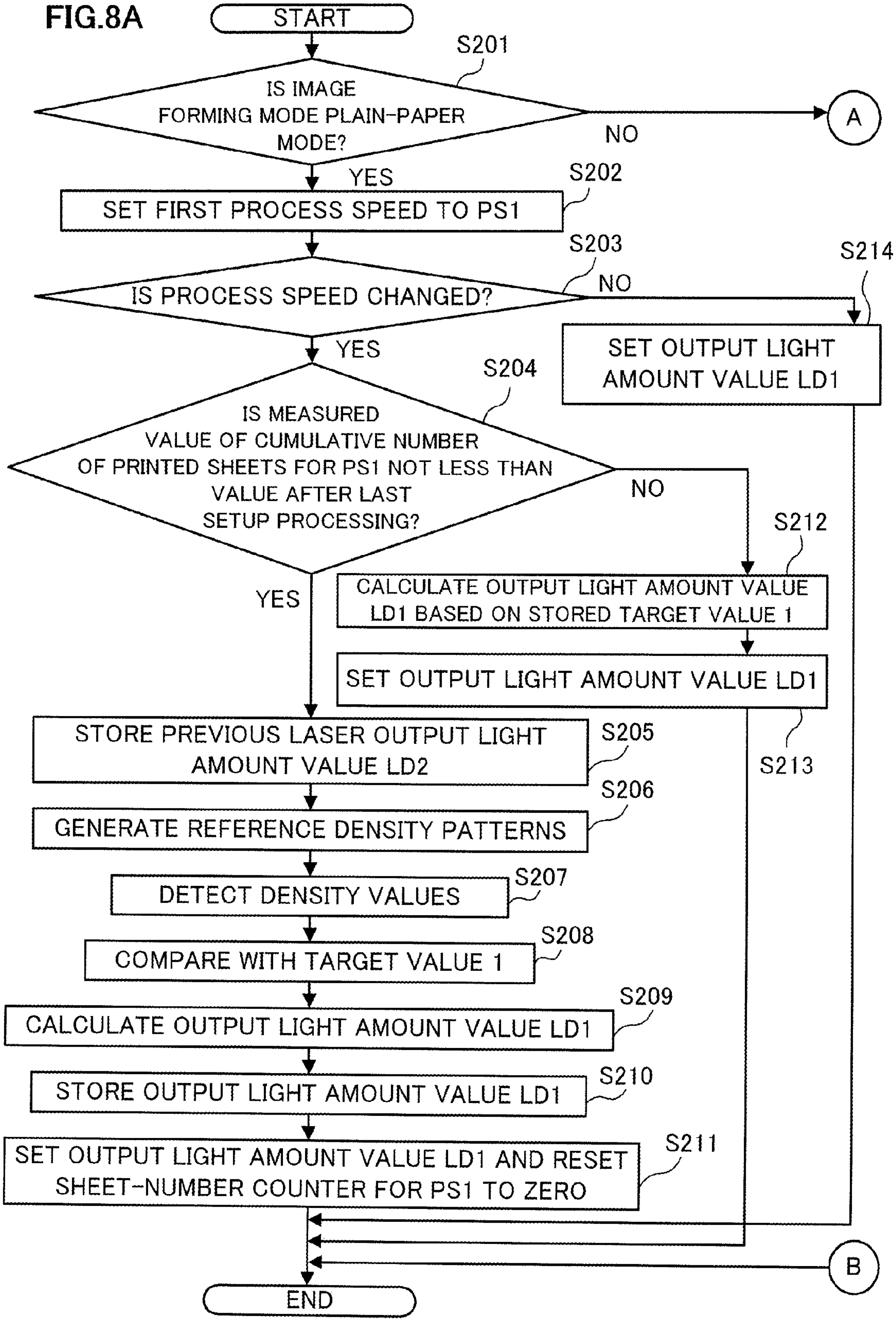
FIG. 8 consisting of 8A and 8B are flowcharts showing an example of the procedure of the start-up setup processing preformed by the controller.
Figure 8B:
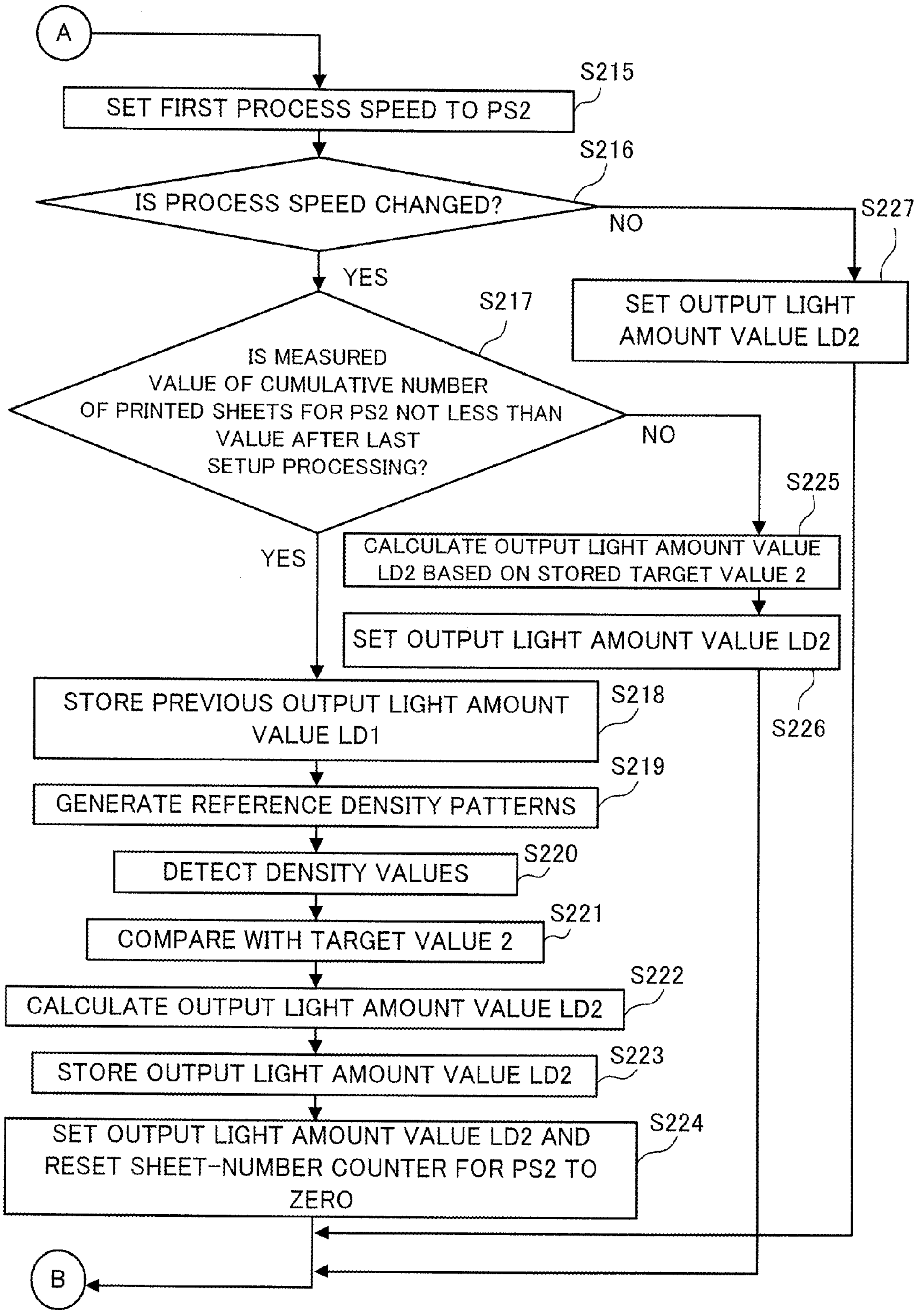

Subsequently, FIG. 8 is a flowchart showing an example of the procedure of the start-up setup processing preformed by the controller 60. As shown in FIG. 8, in the start-up setup processing, the controller 60 determines the set image forming mode (S201). When the controller 60 determines that the plain-paper mode is set in step 201, the controller 60 sets the first process speed PS1 (S202). Then, the controller 60 determines whether or not the process speed PS has been changed since the last image formation (S203).

When the controller determines in step 203 that the first process speed PS1 is set as a result of the change of the process speed PS, the controller 60 determines whether or not the measured value of the cumulative number of printed sheets measured by the sheet-number counter CNT1 for the first process speed PS1 after the last setup processing, is not less than a value (S204). In other words, the controller 60 determines whether or not the measured value of the cumulative number of printed sheets after the last setup processing at the first process speed PS1 reaches the value. When the measured value of the cumulative number of printed sheets reaches the value, the controller 60 starts the setup processing. Here, when it has been a long time since the last image formation, the image density is likely to vary largely. For this reason, "the value" in step 204 may be set to be shorter than the interval of performing the setup processing during image forming operation.

When the setup processing is started, the controller 60 firstly stores, in the EEPROM 604, the output light amount value LD2 of the semiconductor laser 27 at the second process speed PS2 that is set in the last image formation (S205). Subsequently, the controller 60 generates the reference density patterns (see FIG. 3) (S206), and the density values thereof are detected for each color by the reference density detection sensor 55 (S207). Then, the controller 60 compares the detected density values of the reference density patterns for each color with the target values (the target values 1) for the image densities at the first process speed PS1 stored in the EEPROM 604 (S208).

By using the output light amount table determining the correspondences of the output light amount with the detected humidity value, the detected temperature value and the difference between each of the detected density values and the target values 1, the controller 60 calculates the output light amount value LD1 of the semiconductor laser 27 for irradiating the photosensitive drum 31 from the laser-exposure unit 26 (S209). Then, the calculated output light amount value LD1 is stored in the EEPROM 604 (S210). Moreover, the output light amount of the semiconductor laser 27 is set to the calculated output light amount value LD1, and the sheet-number counter CNT1 for the first process speed PS1 is reset to "0" (S211).

In this way, when the image forming apparatus 1 is started up after the cumulative number of printed sheets since the last setup processing at the first process speed PS1 reaches the value, the controller 60 newly performs the setup processing to set the various image forming conditions.

On the other hand, when the controller 60 determines in step 204 that the measured value of the cumulative number of printed sheets after the last setup processing at the first process speed PS1 does not reach the value yet, the controller 60 performs the following setup processing. Specifically, the controller 60 calculates the output light amount value LD1 of the semiconductor laser 27 such that the image density would be the target value 1, by referring to the output light amount table, according to the target value 1 stored in the EEPROM 604 during the last setup processing, the detected humidity value and the detected temperature value which are currently detected (S212). Then, the controller 60 sets the output light amount of the semiconductor laser 27 to the output light amount value LD1 (S213).

When the image forming apparatus 1 is started up before the cumulative number of printed sheets after the last setup processing at the first process speed PS1 reaches the value as described above, the image density is not likely to vary largely. For this reason, the last target value 1 is used and thereby the setup processing requiring the certain period of time is skipped. This leads to an improvement in the productivity of image formation.

Moreover, when the controller 60 determines in step 203 that the process speed PS has not been changed since the last image formation, the controller 60 sets, as the output light amount of the semiconductor laser 27, the output light amount value LD1 stored in the EEPROM 604 during the last setup processing without any modification (S214). In this case, similarly, the image density is not likely to vary largely. Accordingly, the productivity of the image formation is improved by using the output light amount value LD1 set in the last setup processing while skipping the setup processing requiring the certain period of time.

Next, when the controller 60 determines in step 201 that the thick-paper mode is set, the controller 60 sets the second process speed PS2 (S215). Then, the controller 60 determines whether or not the process speed PS has been changed after the last image formation (S216).

When the controller 60 determines in step 216 that the second process speed PS2 is set as a result of the change of the process speed PS, the controller 60 determines whether or not the measured value of the cumulative number of printed sheets measured by the sheet-number counter CNT2 for the second process speed PS2 after the last setup processing is not less than a value (S217). In other words, the controller 60 determines whether or not the measured value of the cumulative number of printed sheets after the last setup processing at the second process speed PS2 reaches the value. When the measured value of the cumulative number of printed sheets reaches the value, the controller 60 starts the setup processing. Here, when a long time elapsed since the last image formation, the image density is likely to vary largely. For this reason, "the value" in step 217 may be set to be shorter than the interval of performing the setup processing during the image forming operation at the second process speed PS2. In addition, in this case, the interval may be set to have a length different from a length of the interval of performing the start-up setup processing at the first process speed PS1.

When the setup processing is started, the controller 60 firstly stores, in the EEPROM 604, the output light amount value LD1 of the semiconductor laser 27 at the first process speed PS1 that is set in the last image formation (S218). Subsequently, the controller 60 generates the reference density patterns (see FIG. 3) (S219), and the density values thereof are detected for each color by the reference density detection sensor 55 (S220). Then, the controller 60 compares the detected density values of the reference density patterns for each color with the target values (the target values 2) for the image densities at the second process speed PS2 stored in the EEPROM 604 (S221).

By using the output light amount table determining the correspondences of the output light amount with the detected humidity value, the detected temperature value and the difference between each of the detected density values and the target values 2, the controller 60 calculates the output light amount value LD2 of the semiconductor laser 27 for irradiating the photosensitive drum 31 from the laser-exposure unit 26 (S222). Then, the calculated output light amount value LD2 is stored in the EEPROM 604 (S223). Moreover, the output light amount of the semiconductor laser 27 is set to the calculated output light amount value LD2, and the sheet-number counter CNT2 for the second process speed PS2 is reset to "0" (S224).

In this way, when the image forming apparatus 1 is started up after the cumulative number of printed sheets since the last setup processing at the second process speed PS2 reaches the value, the controller 60 newly performs the setup processing to set the various image forming conditions.

On the other hand, when the controller 60 determines in step 217 that the measured value of the cumulative number of printed sheets after the last setup processing at the second process speed PS2 does not reach the value yet, the controller 60 performs the following setup processing. Specifically, the controller 60 calculates the output light amount value LD2 of the semiconductor laser 27 such that the image density would be the target value 2, by referring to the output light amount table, according to the target value 2 stored in the EEPROM 604 during the last setup processing, the detected humidity value and the detected temperature value which are currently detected (S225). Then, the controller 60 sets the output light amount of the semiconductor laser 27 to the output light amount value LD2 (S226).

When the image forming apparatus 1 is started up before the cumulative number of printed sheets after the last setup processing at the second process speed PS2 reaches the value as described above, the image density is not likely to vary largely. For this reason, the last target value 2 is used and thereby the setup processing requiring the certain period of time is skipped. This leads to an improvement in the productivity of image formation.

Moreover, when the controller 60 determines in step 216 that the process speed PS has not been changed since the last image formation, the controller 60 sets, as the output light amount of the semiconductor laser 27, the output light amount value LD2 stored in the EEPROM 604 during the last setup processing without any modification (S227). In this case, similarly, the image density is not likely to vary largely. Accordingly, the productivity of the image formation is improved by using the output light amount value LD2 set in the last setup processing while skipping the setup processing requiring the certain period of time.

Figure 9A:
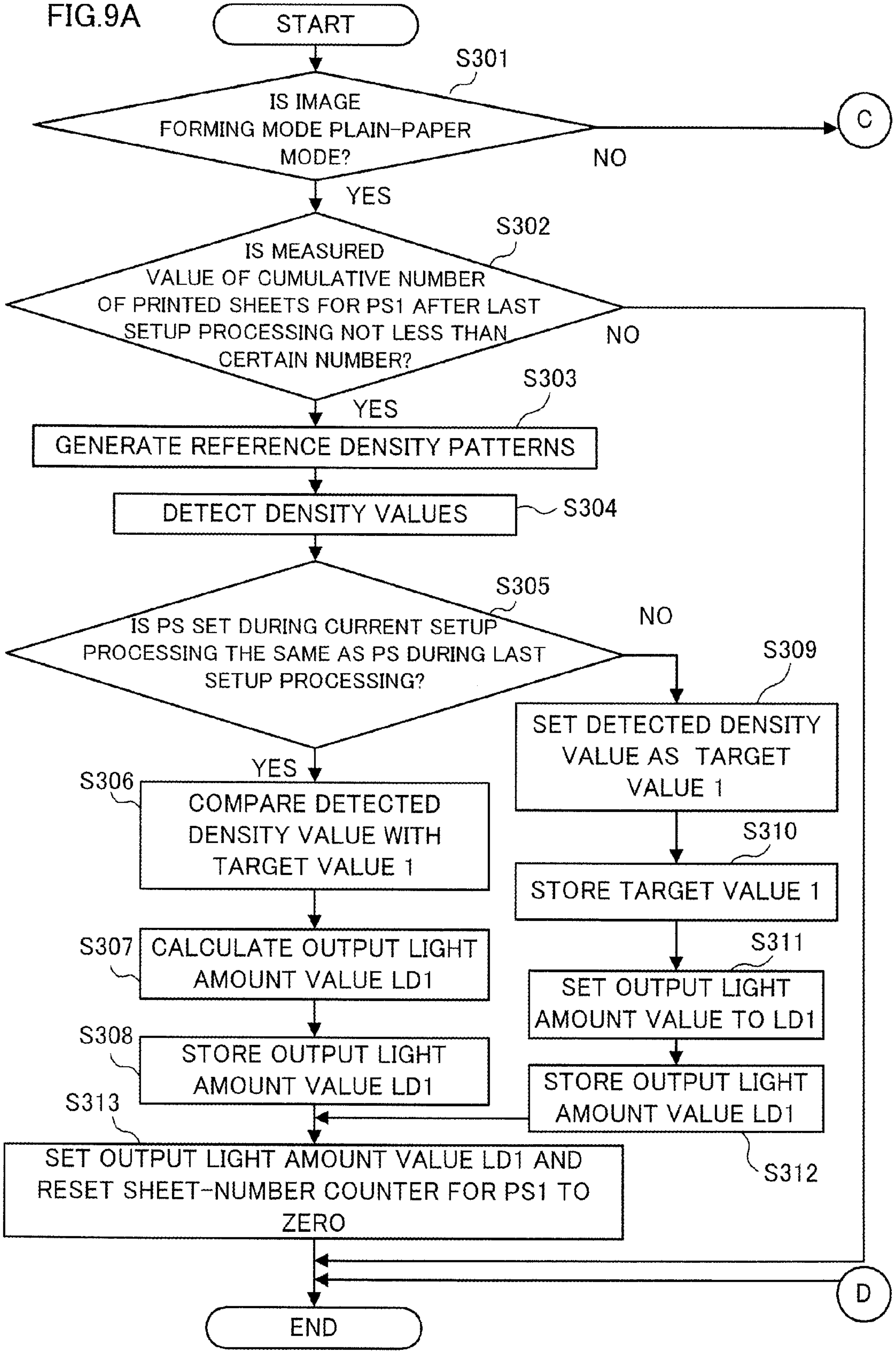
FIG. 9 consisting of 9A and 9B are flowcharts showing an example of the procedure of the setup processing during the image forming operation preformed by the controller.
Figure 9B:
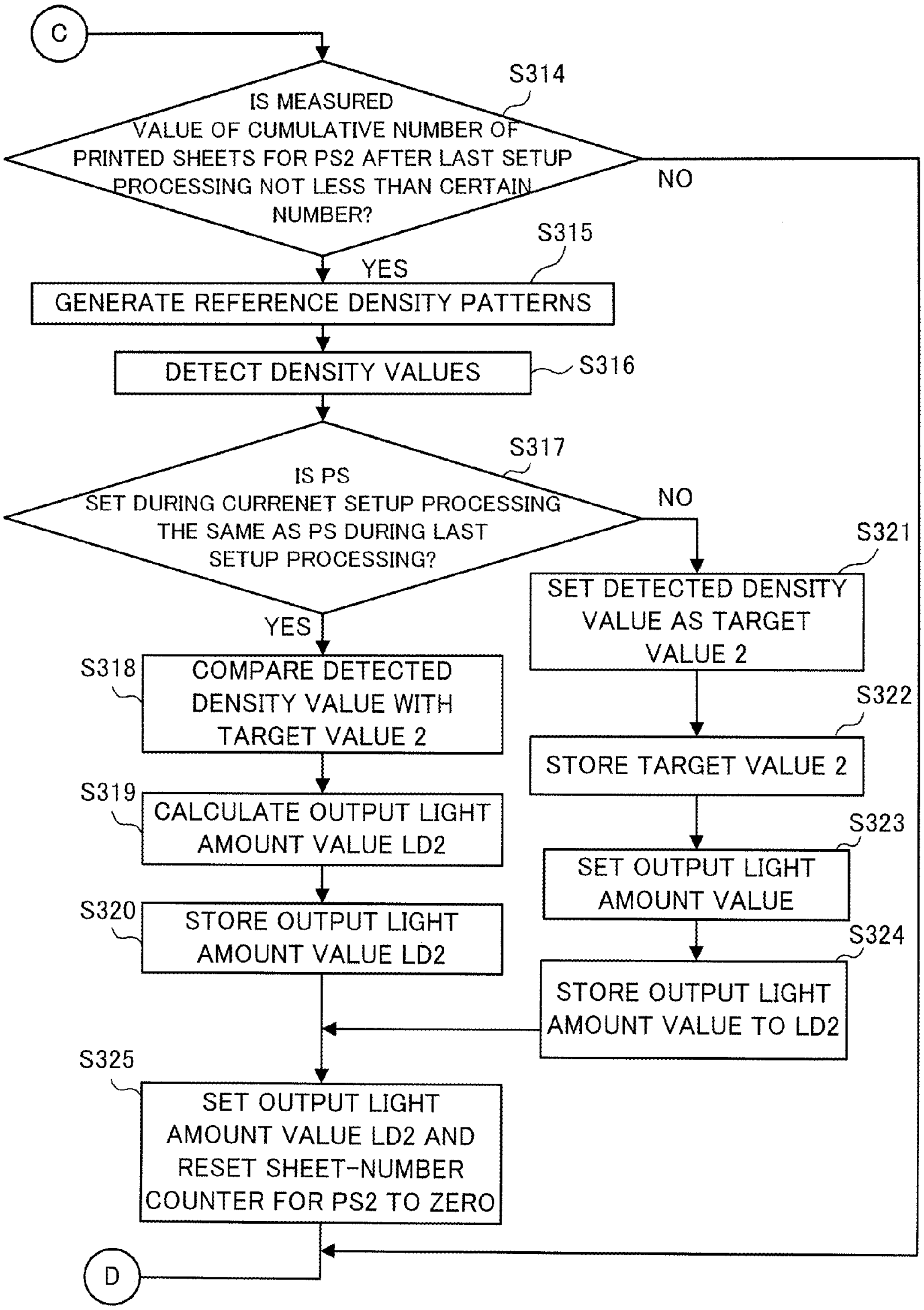

Next, FIG. 9 is a flowchart showing an example of the procedure of the setup processing during the image forming operation preformed by the controller 60. As shown in FIG. 9, in the setup processing during the image forming operation, the controller 60 determines the set image forming mode (S301). When the controller 60 determines in step 301 that the first process speed PS1 is set by setting the plain-paper mode, the controller 60 determines whether or not the measured value of the cumulative number of printed sheets, which the sheet-number counter CNT1 measures for the first process speed PS1 after the last setup processing, is not less than a value (S302). In other words, the controller 60 determines whether or not the measured value of the cumulative number of printed sheets after the last setup processing at the first process speed PS1 reaches the value. When the measured value of the cumulative number of printed sheets reaches the value, the controller 60 starts the setup processing. "The value" here is, for example, a certain number of printed sheets set as the interval of performing the setup processing during the image forming operation at the first process speed PS1.

When the setup processing is started, the controller 60 generates the reference density patterns (see FIG. 3) (S303) and the density values thereof are detected for each color by the reference density detection sensor 55 (S304). Then, the controller 60 determines whether or not the first process speed PS1 set during the current setup processing is the same as the process speed PS set during the last setup processing (S305).

When determining in step 305 that the first setup processing speed PS1 is the same as the process speed PS set during the last setup processing, the controller 60 compares the detected density value of each color reference density pattern detected by the reference density detection sensor 55, with the target value 1 for the image density at the first process speed PS1 stored in the EEPROM 604 inside the controller 60 (S306). Then, by using the output light amount table determining the correspondences of the output light amount with the detected humidity value, the detected temperature value and the difference between each of the detected density values and the target value 1, the controller 60 calculates the output light amount value LD1 of the semiconductor laser 27 for irradiating the photosensitive drum 31 from the laser-exposure unit 26 (S307). The calculated output light amount value LD1 is stored in the EEPROM 604 inside the controller 60 (S308).

On the other hand, when determining in step 305 that the first setup processing speed PS1 is different from the process speed PS set during the last setup processing, that is, when the process speed PS has been changed, the controller 60 sets the detected density value of each color reference density pattern detected by the reference density detection sensor 55 as the target value (the target value 1) for the image density (S309), and stores the target value 1 in the EEPROM 604 inside the controller 60 (S310). Thereafter, the controller 60 determines that the output light amount value of the semiconductor laser 27 is set to the output light amount value LD1 that allows the image density to be the target value 1 (S311), and then stores the output light amount value LD1 in the EEPROM 604 inside the controller 60 (S312).

The controller 60 sets the output light amount value LD1 determined in step 308 or 312, as the output light amount value of the semiconductor laser 27, and resets the sheet-number counter CNT1 for the first process speed PS1 to "0" (S313).

As described above, in the image forming apparatus 1 of the first exemplary embodiment, when the process speed PS is changed as a result of the change in the setting of the image forming mode, the detected density value of each color reference density pattern in the first setup processing at the newly-set first process speed PS1 is set as the target value 1 for the image density at the newly-set first process speed PS1. This setting reduces the variation in image density in the same image forming mode. In addition, this shortens the time required to correct the image forming conditions, and thereby the productivity of image formation is enhanced.

On the other hand, when the controller 60 determines in step 301 that the second process speed PS2 is set by setting the thick-paper mode, the controller 60 determines whether or not the measured value of the cumulative number of printed sheets, which is measured for the second process speed PS2 after the last setup processing by the sheet-number counter CNT2, is not less than a value (S314). In other words, the controller 60 determines whether or not the measured value of the cumulative number of printed sheets after the last setup processing at the second process speed PS2 reaches the value. When the measured value of the cumulative number of printed sheets reaches the value, the controller 60 starts the setup processing. "The value" here is, for example, a certain number of printed sheets set as the interval of performing the setup processing during the image forming operation at the second process speed PS2. Moreover, in this case, the interval may be set to have a length different from a length of the interval of performing the setup processing during the image forming operation at the first process speed PS1.

When the setup processing is started, the controller 60 generates the reference density patterns (see FIG. 3) (S315) and the density values thereof are detected for each color by the reference density detection sensor 55 (S316). Then, the controller 60 determines whether or not the second process speed PS2 set during the current setup processing is the same as the process speed PS set during the last setup processing (S317).

When the controller 60 determines in step 317 that the second setup processing speed PS2 is the same as the process speed PS set during the last setup processing, the controller 60 compares the detected density value of each color reference density pattern detected by the reference density detection sensor 55, with the target value 2 for the image density at the second process speed PS2 stored in the EEPROM 604 inside the controller 60 (S318). Then, by using the output light amount table determining the correspondences of the output light amount with the detected humidity value, the detected temperature value and the difference between each of the detected density values and the target value 2, the controller 60 calculates the output light amount value LD2 of the semiconductor laser 27 for irradiating the photosensitive drum 31 from the laser-exposure unit 26 (S319). The calculated output light amount value LD2 is stored in the EEPROM 604 inside the controller 60 (S320).

On the other hand, when the controller 60 determines in step 317 that the second setup processing speed PS2 is different from the process speed PS set during the last setup processing, that is, when the process speed PS has been changed, the controller 60 sets the detected density value of each color reference density pattern detected by the reference density detection sensor 55 as the target value (the target value 2) for the image density (S321), and stores the target value 2 in the EEPROM 604 inside the controller 60 (S322). Thereafter, the controller 60 determines that the output light amount value of the semiconductor laser 27 is set to the output light amount value LD2 that allows the image density to be the target value 2 (S323), and then stores the output light amount value LD2 in the EEPROM 604 inside the controller 60 (S324).

The controller 60 sets the output light amount value LD2 determined in step 320 or 324, as the output light amount value of the semiconductor laser 27, and resets the sheet-number counter CNT2 for the second process speed PS2 to "0" (S325).

In this case, similarly, when the process speed PS is changed as a result of the change in the setting of the image forming mode, the detected density value of each color reference density pattern in the first setup processing at the newly-set second process speed PS2 is set as the target value 2 for the image density at the newly-set second process speed PS2. This setting reduces the variation in image density in the same image forming mode. In addition, this shortens the time required to correct the image forming conditions, and thereby the productivity of image formation is enhanced.

Subsequently, the ending setup processing is performed in the substantially same manner as the setup processing during the image forming operation shown in FIG. 9. In the ending setup processing, "the value" used for the determination in step 302 shown in FIG. 9 may be set to be shorter than the interval of performing the setup processing during the image forming operation at the first process speed PS1 in consideration of a case where the image forming apparatus 1 will not be in use for a long time until the next image formation. Similarly, "the value" used for the determination in step 314 may be set to be shorter than the interval of performing the setup processing during the image forming operation at the second process speed PS2.

It should be noted that, although the interval of performing each of the start-up setup processing, the setup processing during image forming operation and the ending setup processing is set as a certain number of printed sheets in the image forming apparatus 1 of the first exemplary embodiment, the interval of performing each kind of the setup processing may be set as a certain period of time. In addition, if the environment such as the temperature and the humidity changes to an extent more than a certain range, if a member that is a constituent factor determining the image forming conditions is exchanged for a new one, if the two-component developer is exchanged for a new one, or otherwise, the preconditions for setting the image forming conditions change largely at the time of turning on the image forming apparatus 1. For this reason, the image forming apparatus 1 may be configured to perform the setup processing in the first image formation after the process speed PS is changed.

Hereinafter, more detailed descriptions will be given for the point that each kind of the setup processing is performed when the value of the cumulative number of printed sheets measured by the sheet-number counter CNT1 or CNT2 reaches the certain interval determined for the process speed PS1 or PS2.

Figure 10:
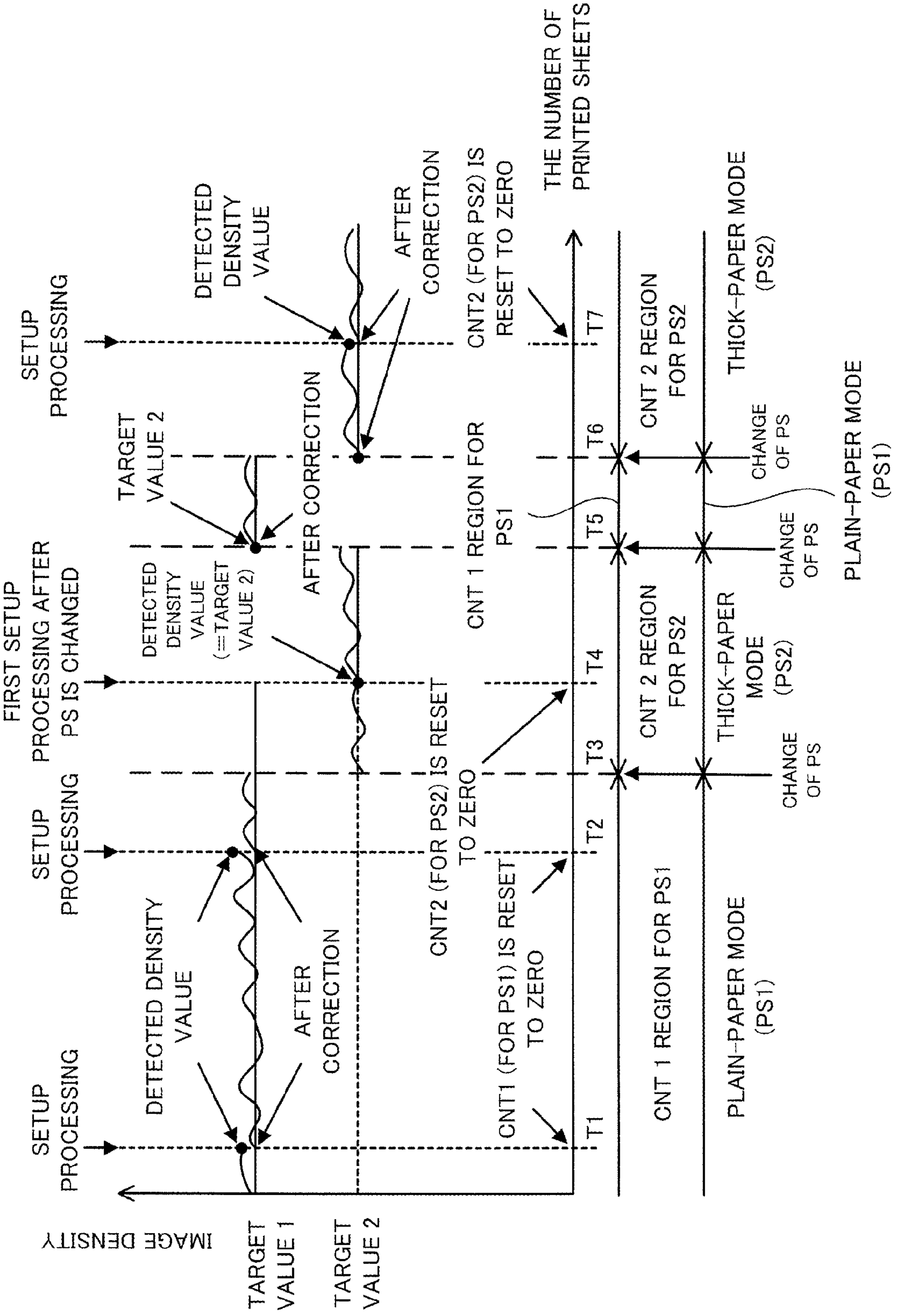
FIG. 10 is a diagram explaining timings of performing the setup processing during the image forming operation.

FIG. 10 is a diagram explaining timings of performing the setup processing during the image forming operation (here, also simply called a "setup processing"). The descriptions will be given in chronological order by use of FIG. 10. At first, at a time T1, the setup processing for a state where the first process speed PS1 of the plain-paper mode is set is performed. Here, the setup processing at the time T1 is assumed to be the second or subsequent setup processing after the first process speed PS1 is set. Accordingly, at the time T1, the following setup processing is performed. Specifically, the detected density value of each color reference density pattern detected by the reference density detection sensor 55 is compared with the target value 1 for the image density at the first process speed PS1 stored in the EEPROM 604 inside the controller 60. Then, according to the comparison result, the detected humidity value and the detected temperature value, the output light amount value LD1 of the semiconductor laser 27 is corrected such that the image density would be the target value 1. At this time, the sheet-number counter CNT1 is reset to "0."

Next, when the plain-paper mode is kept set, the next setup processing is performed at a time T2 when the measured value of the cumulative number of printed sheets for the first process speed PS1 by the sheet-number counter CNT1 reaches the interval for the setup processing at the first process speed PS1. At the time T2, the setup processing is performed in the same procedure as that at the time T1.

Thereafter, the plain-paper mode (the first process speed PS1) is changed to the thick-paper mode (the second process speed PS2) at a time T3 before the measured value of the cumulative number of printed sheets for the first process speed PS1 by the sheet-number counter CNT1 reaches the interval for the setup processing. Until the time T3, the sheet-number counter CNT1 for the first process speed PS1 keeps measuring the number of printed sheets, and stores the measured value of the cumulative number between the time T2 and the time T3 at the first process speed PS1. Then, at the time T3, the sheet-number counter CNT2 for the second process speed PS2 starts measuring the number of printed sheets.

At a time T4 when the measured value of the cumulative number of printed sheets of the sheet-number counter CNT2 reaches the interval for the setup processing at the second process speed PS2, the first setup processing after the change to the second process speed PS2 is performed. Accordingly, at the time T4, the following setup processing is performed. Specifically, the detected density value of each color reference density patterns detected by the reference density detection sensor 55 is set as the target value 2 for the image density. Then, the target value 2 is stored in the EEPROM 604 inside the controller 60, and the output light amount value LD2 of the semiconductor laser 27 that allows the image density to be the target value 2 is set. Moreover, at this time, the sheet-number counter CNT2 is reset to "0."

After the first setup processing at the time T4 since the change to the second process speed PS2, the thick-paper mode (the second process speed PS2) is again changed to the plain-paper mode (the first process speed PS1) at a time T5 before the measured value of the cumulative number of printed sheets by the sheet-number counter CNT2 reaches the interval for the setup processing. At this time (time T5), the measured value of the cumulative number of printed sheets for the first process speed PS1 by the sheet-number counter CNT1 is assumed not to reach the interval for the setup processing at the first process speed PS1. For this reason, at the time T5, the target value 1 for the image density at the first process speed PS1 stored in the EEPROM 604 inside the controller 60 is regarded as the detected density value. Thus, the output light amount value LD1 of the semiconductor laser 27 for irradiating the photosensitive drum 31 from the laser-exposure unit 26 is calculated by using the output light amount table determining the correspondences of the output light amount with the detected density value (=the target value 1), the detected humidity value and the detected temperature value. Thereby, the output light amount value LD1 of the semiconductor laser 27 is corrected such that the image density would be the target value 1.

It should be noted that, until the time T5, the sheet-number counter CNT2 for the second process speed PS2 keeps measuring the number of printed sheets, and stores the measured value of the cumulative number between the time T4 and the time T5 at the second process speed PS2. Then, at the time T5, the sheet-number counter CNT1 for the first process speed PS1 starts measuring the number of printed sheets.

Subsequently, after the setup processing at the time T5, the plain-paper mode (the first process speed PS1) is again changed to the thick-paper mode (the second process speed PS2) at a time T6 before the measured value of the cumulative number of printed sheets by the sheet-number counter CNT1 reaches the interval for the setup processing. At this time (time T6), the measured value of the cumulative number of printed sheets for the second process speed PS2 by the sheet-number counter CNT2 does not reach the interval for the setup processing at the second process speed PS2. For this reason, at the time T6, the target value 2 for the image density at the second process speed PS2 stored in the EEPROM 604 inside the controller 60 is regarded as the detected density value. Thus, the output light amount value LD2 of the semiconductor laser 27 for irradiating the photosensitive drum 31 from the laser-exposure unit 26 is calculated by using the output light amount table determining the correspondences of the output light amount with the detected density value (=the target value 2), the detected humidity value and the detected temperature value. Thereby, the output light amount value LD2 of the semiconductor laser 27 is corrected such that the image density would be the target value 2.

Thereafter, at a time T7 when the measured value of the cumulative number of printed sheets of the sheet-number counter CNT2 reaches the interval for the setup processing, the setup processing for a state where the second process speed PS2 of the thick-paper mode is set is performed. The setup processing at the time T7 is the second or subsequent setup processing after the second process speed PS2 is set. Accordingly, the detected density value of each color reference density pattern detected by the reference density detection sensor 55 is compared with the target value 2 for the image density at the second process speed PS2 stored in the EEPROM 604 inside the controller 60. Then, according to the comparison result, the detected humidity value and the detected temperature value, the output light amount value LD2 of the semiconductor laser 27 is corrected such that the image density would be the target value 2. At this time, the sheet-number counter CNT2 is reset to "0."

As described above, the controller 60 of the first exemplary embodiment performs the setup processing when the value of the cumulative number of printed sheets measured by the sheet-number counter CNT1 or CNT2 reaches the certain interval determined for the first process speed PS1 or the second process speed PS2. In this way, the controller 60 optimizes the timings of performing the setup processing to enhance the productivity of the image formation. Moreover, the variation in the image density in the same image forming mode is reduced by correcting the various image forming conditions through the executions of the setup processing according to the various conditions.

Here, consider a case where the detected density value of each color reference density pattern of the reference density detection sensor 55 in the each kind of the setup processing has a difference beyond a certain range from the target value for the image density for each of the process speeds PS stored in the EEPROM 604 inside the controller 60. To deal with this case, the controller 60 may be configured to perform more accurate setup processing by using a larger number of reference density patters for each color with a larger number of tone variations than those shown in FIG. 3. Otherwise, in this case, the controller 60 may also be configured to repeat the execution of the setup processing using the reference density patterns for each color shown in FIG. 3 two times or more. Instead, the controller 60 may be configured to set a larger correction amount for each of the various image forming conditions in the setup processing than usual.

Heretofore, the descriptions has been described for the case where the controller 60 of the first exemplary embodiment generates the reference density patterns for each color as the state quantities each indicting the state of an image formed by a corresponding one of the image forming units 30, and then performs the setup processing by using the detected density value of each color reference density pattern of the reference density detection sensor 55. However, it should be noted that other kinds of state quantities each indicating the state of an image are usable to perform the setup processing, in addition to the detected density values of the reference density patterns for each color. One usable state quantity is the surface potential of the photosensitive drum 31 that is detected by the potential sensor 68 and indicates the state of an electrostatic latent image formed on the photosensitive drum 31. Instead, though not being exactly the state quantity indicating the state of an image, the surface potential of the photosensitive drum 31 is also usable which is detected after the photosensitive drum 31 is charged by the charging roll 32 and before an electrostatic latent image is formed. As the surface potential, a dark area potential, an intermediate potential and a light area potential, which are latent image potentials, are usable. In this case, as the image forming conditions, controlled are the output light amount value of the semiconductor laser 27 in the laser-exposure unit 26, the value of the charge bias voltage supplied to the charging roll 32, and the value of the developing bias voltage applied to the developing roll 34.

Moreover, the toner density detection value detected by the toner density sensor 69, which is an example of a density detecting unit, is also usable, though it is also not the state quantity indicating the state of an image. In this case, as the image forming conditions, controlled are the output light amount value of the semiconductor laser 27 in the laser-exposure unit 26, the value of the charge bias voltage supplied to the charging roll 32, the value of the developing bias voltage applied to the developing roll 34, and the correction amounts of color toners refilled in the respective developing units 33.

The toner density detection value detected by the toner density sensor 69 is outputted as different values before and after the change of the process speed PS because the rotation speeds of the developing roll 34 and a conveyance screw (not illustrated) in each of the developing units 33 are changed with the change of the process speed PS.

In addition, the setup processing may be performed by using, as the state quantity indicating the state of an image, at least one of a detected density value and a detected color value of each of reference density patterns for each color formed on the paper sheet P. In this case, as the image forming conditions, controlled are the output light amount value of the semiconductor laser 27 in the laser-exposure unit 26, the value of the charge bias voltage supplied to the charging roll 32, the value of the developing bias voltage applied to the developing roll 34, the surface temperature and the fixing speed of the fixing roll 82 of the fixing unit 80, and the value of the transfer bias voltage applied to the first transfer roll 42.

It should be noted that an employable method of forming the reference density patterns for each color on the intermediate transfer belt 41 or the paper sheet P is a method in which the controller 60 forms the patters by reading reference density pattern data stored in the main storing unit 90, a method in which the controller 60 forms the patterns by reading a certain reference density chart from the image capturing apparatus 4, or another equivalent method.

As described above, in the image forming apparatus 1 of the first exemplary embodiment, when the process speed PS is changed as a result of a change in the image forming mode setting, the detected density values of the reference density patterns for each color, which are examples of the information detected in at least the first setup processing at the newly-set processing speed PS, are each set as the target value for the image density at the newly-set processing speed PS. This setting reduces the variation in the image density in the same image forming mode.

In addition, the interval of performing the setup processing is determined for each of the image forming modes, and the image forming apparatus 1 is configured to perform the setup processing when, for example, the measured value of the cumulative number of printed sheets in the each of the image forming modes reaches the correspondingly-determined interval. With this configuration, the timing of performing the setup processing is optimized, thereby enhancing the productivity in the image formation. Incidentally, in this case, the intervals of performing the setup processing for the respective image forming modes may also be set to be the same time length.

Second Exemplary Embodiment

The descriptions in the first exemplary embodiment show the configuration in which, when the process speed PS is changed as a result of a change in the image forming mode setting, the detected density value of each color reference density pattern is set as the target value for the image density at the newly-set process speed PS. Here, the detected density value is an example of the information detected in the first setup processing at the newly-set process speed PS. In the second exemplary embodiment, descriptions will be provided for a configuration in which a certain one of the image forming modes is set as a standard mode. More specifically, in this configuration, when the image forming mode is changed from the standard mode to one other than the standard mode, the detected density value of each color reference density pattern is set as the target value for the image density at the newly-set process speed PS. Here, the detected density value is also an example of the information detected at the first setup processing at the newly-set process speed PS. Incidentally, the same reference numerals are given to the same components as those in the first exemplary embodiment, and the detailed explanations thereof are omitted here.

An image forming apparatus 1 of the second exemplary embodiment is configured to have a certain one of the image forming modes set as a standard mode. Specifically, a controller 60 in the second exemplary embodiment includes a standard mode input function and an automatic setting function. The standard mode input function sets, as the standard mode, an image forming mode manually inputted by a user from a manual input panel (not illustrated) as an example of a setting input unit in the image forming apparatus 1. On the other hand, the automatic setting function sets, as the standard mode, one of the image forming modes selected in accordance with a criterion. The controller 60 here also functions as an example of a speed setting unit in the second exemplary embodiment.

Moreover, the controller 60 includes a total cumulative sheet-number counter T_CNT for each image forming mode as an example of a measuring unit that measures a time period elapsed after the last adjustment of the image forming conditions in the each image forming mode. Thereby, the controller 60 is configured to be capable of setting the standard mode according to the total cumulative number of printed sheets measured by the total cumulative sheet-number counter T_CNT in each image forming mode. Besides the total cumulative number of printed sheets, examples of the time period here include the cumulative number of rotations of the photosensitive drum 31, a moving distance of the surface of the photosensitive drum 31, the number of printed sheets, a printing time period, a time period of rotations of the photosensitive drum 31, a charging time period of the charging roll 32, and an actual time period, all of which accumulate after the last adjustment of the image forming conditions.

Figure 11:
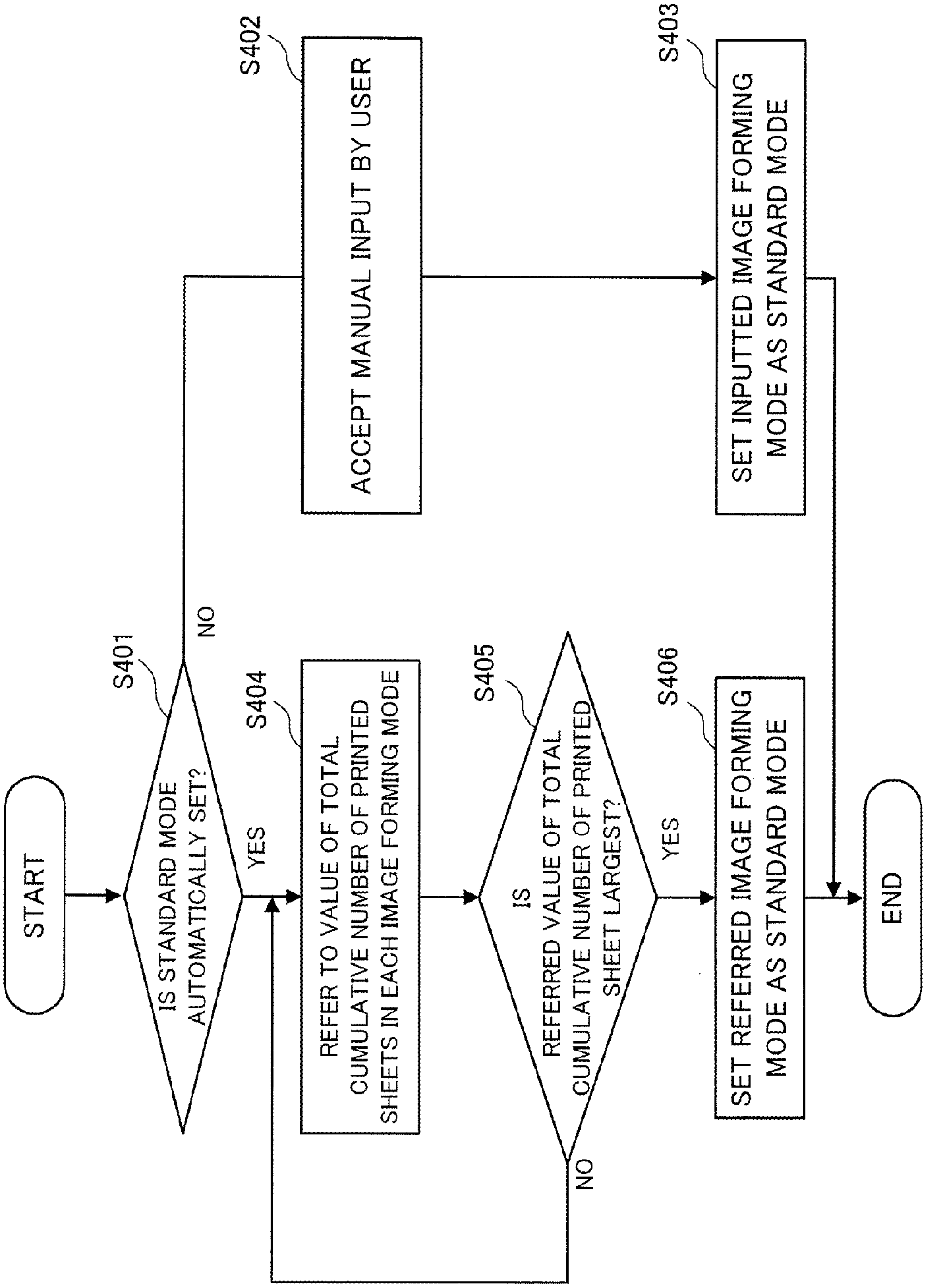
FIG. 11 is a flowchart showing an example of the procedure of the processing in which the controller sets the standard mode.

Here, FIG. 11 is a flowchart showing an example of the procedure of the processing in which the controller 60 sets the standard mode. As shown in FIG. 11, the controller 60 gets a user to select how to set the standard mode, that is, whether to set, as the standard mode, an image forming mode manually inputted by a user from the manual input panel of the image forming apparatus 1, or to automatically set, as the standard mode, one of the image forming modes selected in accordance with the criterion (S401).

When the user selects the mode of setting the standard mode through the manual input in step 401, the controller 60 accepts a manual input by the user from the manual input panel (S402), and sets the inputted image forming mode as the standard mode (S403). Here, the controller 60 may also be configured to get the user to specify a paper type and a basis weight of paper sheets P from the manual input panel, and to set, as the standard mode, an image forming mode corresponding to the paper type and the basis weight of paper sheets P. In addition, the specifying of a paper type and a basis weight of paper by the user may also be regarded as an action of selecting the mode of setting the standard mode through the manual input in step 401.

On the other hand, when the user selects the mode of automatically setting, as the standard mode, one of the image forming modes selected in accordance with the criterion in step 401, the controller 60 refers to the value of the cumulative number of printed sheets by the total cumulative sheet-number counter T_CNT in each image forming mode (S404), and determines which one of the image forming modes has the largest value of the total cumulative number of the printed sheets measured by the total cumulative sheet-number counter T_CNT (S405). Then, the controller 60 sets, as the standard mode, the image forming mode determined as the one having the largest value of the total cumulative number of the printed sheets (S406).

More precisely, here consider a state where the setting has a "plain-paper mode" using plain paper (for example, a basis weight of 64 $g/m^2$) and a "thick-paper mode" using thick paper (for example, a basis weight 108 $g/m^2$) or OHP sheets as the paper sheet P. In this state, a comparison is made between the total cumulative number measured by a total cumulative sheet-number counter T_CNT1 in the plain-paper mode, and the total cumulative number measured by a total cumulative sheet-number counter T_CNT2 in the thick-paper mode. When the comparison result shows that the total cumulative number in the plain-paper mode is larger than that in the thick-paper mode, for example, the plain-paper mode is set as the standard mode.

In addition, in the image forming apparatus 1 of the second exemplary embodiment, in the case where the image forming mode is changed from one other than the standard mode to the standard mode, the setup processing based on the target value for the prestored image density is performed at a timing when the value of the cumulative number of printed sheets after the last setup processing measured by the sheet-number counter CNT of the standard mode exceeds a certain interval determined for the process speed PS in the standard mode, and additionally at a timing when the image forming mode is changed (that is, the process speed is changed), if necessary.

In contrast, in the case where the image forming mode is changed from the standard mode to one other than the standard mode, the setup processing is not performed at the timing when the image forming mode is changed. Then, after the image forming mode is changed to a new mode, the first setup processing is performed at a timing when the value of the cumulative number of printed sheets after the last setup processing measured by the sheet-number counter CNT of the new image forming mode reaches for the first time a certain interval determined for the process speed PS in the new image forming mode. In this first setup processing, the density value of each color reference density pattern detected in the first setup processing is set as the target value for the image density at the newly-set process speed PS. Then, the setup processing based on the set target value is performed.

Figure 12:
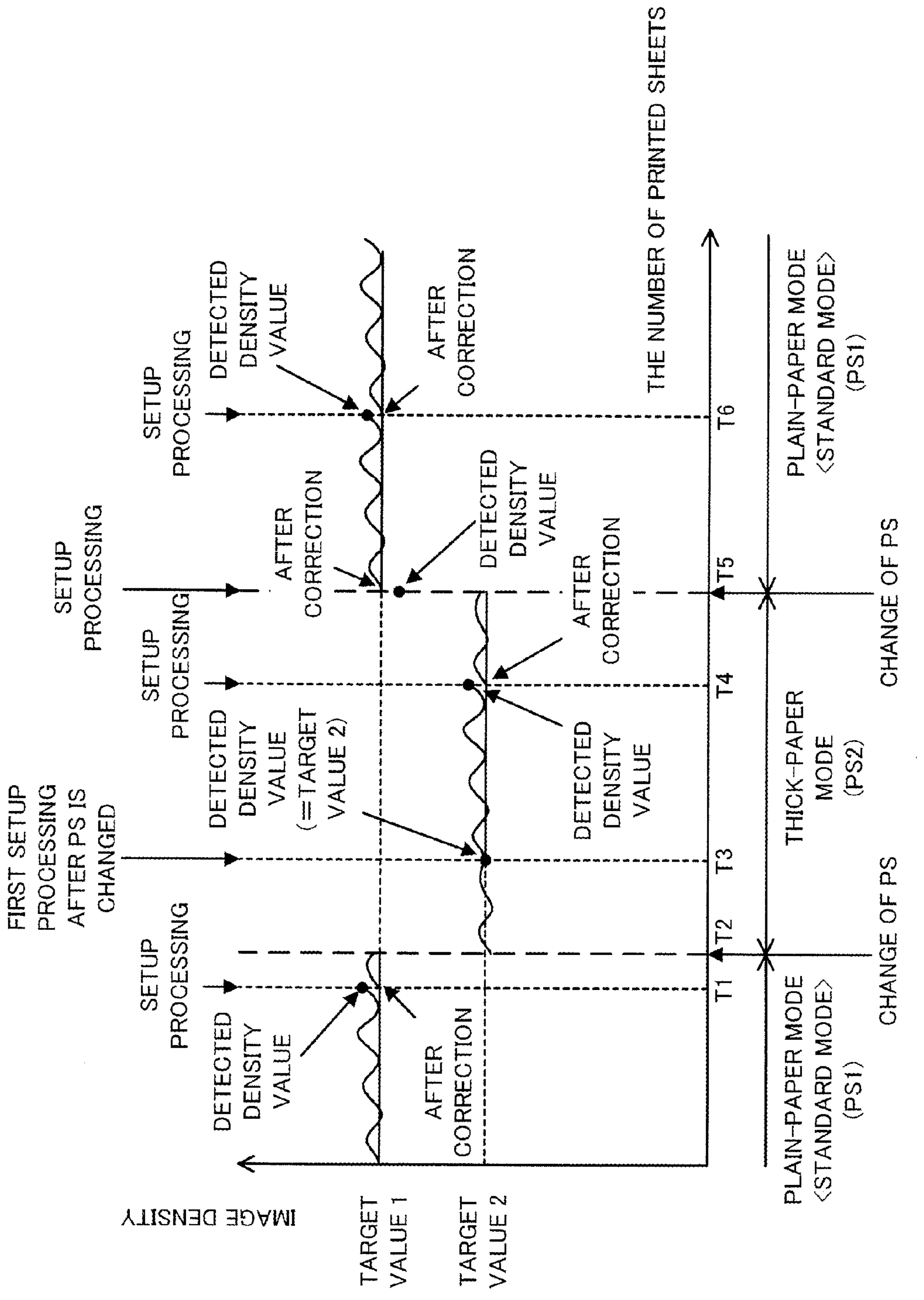
FIG. 12 is a diagram explaining timings of performing the setup processing during the image forming operation and the contents in the setup processing.

FIG. 12 is a diagram explaining timings of performing the setup processing during the image forming operation (here, also simply called a "setup processing") and the contents in the setup processing. In FIG. 12, the plain-paper mode is assumed to be set as the standard mode. Hereinafter, the descriptions will be given in chronological order by use of FIG. 12. At first, the plain-paper mode is set as the standard mode and, at a time T1, the setup processing for a state where the first process speed PS1 of the plain-paper mode is set is performed. Here, the setup processing at the time T1 is assumed to be the second or subsequent setup processing after the first process speed PS1 is set. Accordingly, at the time T1, the following setup processing is performed. Specifically, the detected density value of each color reference density pattern detected by the reference density detection sensor 55 is compared with the target value 1 for the image density at the first process speed PS1 stored in the EEPROM 604 inside the controller 60. Then, according to the comparison result, the detected humidity value and the detected temperature value, the output light amount value LD1 of the semiconductor laser 27 is corrected such that the image density would be the target value 1. At this time, the set output light amount LD1 is stored as an output light amount LD1_old in the EEPROM 604, and the sheet-number counter CNT1 is reset to "0."

The plain-paper mode is assumed to be changed to the thick-paper mode (the second process speed PS2) other than the standard mode, at a time T2 before the measured value of the cumulative number of printed sheets for the first process speed PS1 by the sheet-number counter CNT1 reaches the interval for the setup processing at the first process speed PS1 and after the time T1. At the time T2, the setup processing is not performed. Incidentally, until the time T2, the sheet-number counter CNT1 for the first process speed PS1 keeps measuring the number of printed sheets, and stores the measured value of the cumulative number between the time T1 and the time T2 at the first process speed PS1. Then, at the time T2, the sheet-number counter CNT2 for the second process speed PS2 starts measuring the number of printed sheets.

At a time T3 when the measured value of the cumulative number of printed sheets of the sheet-number counter CNT2 reaches the interval for the setup processing at the second process speed PS2, the first setup processing after the change to the second process speed PS2 is performed. Accordingly, at the time T3, the following setup processing is performed. Specifically, since the setup processing at the time T3 is a setup process where the mode other than the standard process is set, the detected density value of each color reference density patterns detected by the reference density detection sensor 55 is set as the target value 2 for the image density and the target value 2 is stored in the EEPROM 604 inside the controller 60. Then, the output light amount value LD2 of the semiconductor laser 27 that allows the image density to be the target value 2 is set. Moreover, at this time, the sheet-number counter CNT2 is reset to "0."

After the first setup processing at the time T3, the second setup processing for the second process speed PS2 is performed at a time T4 when the measured value of the cumulative number of printed sheets by the sheet-number counter CNT2 reaches the interval for the setup processing. For this reason, in the setup processing at the time T4, the detected density value of each color reference density patterns detected by the reference density detection sensor 55 is compared with the target value 2 for the image density at the second process speed PS2 stored in the EEPROM 604 inside the controller 60 at the time T3. Then, according to the comparison result, the detected humidity value and the detected temperature value, the output light amount value LD2 of the semiconductor laser 27 is corrected such that the image density would be the target value 2. At this time, the sheet-number counter CNT2 is reset to "0."

Subsequently, the thick-paper mode (the second process speed PS2) is again changed to the standard mode (the first process speed PS1) at a time T5 before the measured value of the cumulative number of printed sheets by the sheet-number counter CNT2 reaches the interval for the setup processing. Since the setup process at this time (time T5) is the setup process in the standard mode, the setup process is performed even when the measured value of the cumulative number of printed sheets for the first process speed PS1 by the sheet-number counter CNT1 does not reach the interval for the setup processing at the first process speed PS1. In the setup process at the time T5 when the thick-paper mode is changed to the standard mode, the detected density value of each color reference density patterns detected by the reference density detection sensor 55 is compared with the target value 1 for the image density at the first process speed PS1 stored in the EEPROM 604 inside the controller 60. Then, according to the comparison result, the detected humidity value and the detected temperature value, the output light amount value LD1 of the semiconductor laser 27 is corrected such that the image density would be the target value 1.

It should be noted that, until the time T5, the sheet-number counter CNT2 for the second process speed PS2 keeps measuring the number of printed sheets, and stores the measured value of the cumulative number between the time T3 and the time T5 at the second process speed PS2. Then, at the time T5, the sheet-number counter CNT1 for the first process speed PS1 starts measuring the number of printed sheets.

Subsequently, after the setup processing at the time T5, the second setup process is performed, after the process speed PS is changed to the first process speed PS1, at a time T6 when the measured value of the cumulative number of printed sheets by the sheet-number counter CNT1 reaches the interval for the setup processing. For this reason, in the setup process at the time T6, the detected density value of each color reference density pattern detected by the reference density detection sensor 55 is compared with the target value 1 for the image density at the first process speed PS1 stored in the EEPROM 604 inside the controller 60. Then, according to the comparison result, the detected humidity value and the detected temperature value, the output light amount value LD1 of the semiconductor laser 27 is corrected such that the image density would be the target value 1. At this time, the sheet-number counter CNT1 is reset to "0."

In the above-mentioned way, in the image forming apparatus 1 of the second exemplary embodiment, the certain image forming mode is set as the standard mode. Then, when the image forming mode is changed from one other than the standard mode to the standard mode, the setup processing based on the target value for the prestored image density is performed. In contrast, when the image forming mode is changed from the standard mode to one other than the standard mode, the density value of each color reference density pattern is detected in the first setup processing after the change to the other image forming mode, and the detected density value is set as the target value for the image density at the newly-set process speed PS. Then, the setup processing based on the newly-set target value is performed. This setup processing reduces a variation in image density in the same image forming mode. In addition, as for a frequently-used mode such as the plain-paper mode, this setup processing reduces a variation in image density between previous printing and next printing in the plain-paper mode, even though printing in another image forming mode is performed between the previous printing and the next printing in the plain-paper mode.

Moreover, in the image forming apparatus 1 of the second exemplary embodiment, the setup processing in each of the standard mode and an image forming mode other than the standard mode is performed at a timing when the value of the cumulative number of printed sheets measured by the corresponding sheet-number counter CNT exceeds the certain interval determined for the image forming mode. In this case, the interval for the setup processing in the image forming mode other than the standard mode, for example, in a less-frequently used image forming mode may be set longer than that in the standard mode (plain-paper mode) that is used more frequently. Such a longer interval leads to a reduction in the number of executions of the setup processing in the less-frequently used image forming mode, and thereby further improves the productivity of image formation.

However, the image forming apparatus 1 may be configured to perform the setup processing at a timing when the image forming mode is changed from one other than the standard mode to the standard mode. Moreover, in this case, the image forming apparatus 1 may also be configured to perform the setup processing at the time of changing the mode only when an environment value such as humidity or a temperature is out of a range.

In addition, when the image forming mode is changed one other than the standard mode to the standard mode (for example, the time T5 in FIG. 12), the output light amount value LD of the semiconductor laser 27 LD may be set in the following method.

For instance, here, the method is explained by taking the case shown in FIG. 12 as an example. When the setup processing is performed two or more times in the thick-paper mode before the image forming mode is changed to the standard mode, the output light amount value LD2 of the semiconductor laser 27 set in the first setup processing (the setup processing at the time T3) in this thick-paper mode is stored as LD2_S in the EEPROM 604 inside the controller 60. Similarly, the output light amount value LD2 of the semiconductor laser 27 set in the last setup processing (the setup processing at the time T4) in this thick-paper mode is stored as LD2_E in the EEPROM 604 inside the controller 60. Then, a mathematical operation with the following formula (1) is performed by using both the output light amount values LD2_S and LD2_E stored in the thick-paper mode, and the output light amount value LD1_old that is set in the last setup processing (the setup processing at the time T1) in the previous standard mode and stored in the EEPROM 604. Thereby, the output light amount value LD1 of the semiconductor laser 27 is set when the image forming mode is again changed to the standard mode (at the time T5 in FIG. 12). Specifically, $$LD1=LD1\_old+K\cdot(LD2\_E-LD2\_S) \quad (1),$$

where K denotes a correction coefficient.

Incidentally, an output light amount value LD1_old' that is set before the last setup processing (the setup processing at the time T1) in the previous standard mode and stored in the EEPROM 604 may also be used as the output light amount value LD1_old.

It is conceivable that the output light amount value LD of the semiconductor laser 27 in the standard mode immediately after the change from the thick-paper mode varies according to variations in the output light amount value LD of the semiconductor laser 27 in the thick-paper mode before the change to the standard mode. For this reason, a value obtained by multiplying, by the certain correction coefficient K, a variation amount (LD2_E-LD2_S) in the output light amount value LD of the semiconductor laser 27 in the thick-paper mode before the change to the standard mode is added to the output light amount value LD1_old set in the last place in the previous standard mode. By performing the operation, obtained is a highly-accurate estimated value for the output light amount value LD1 of the semiconductor laser 27 after the image forming mode is again changed to the standard mode. The use of this method allows the output light amount value LD of the semiconductor laser 27 to be quickly set when the image forming mode is changed to the standard mode, and thereby leads to an improvement in productivity of image formation.

Moreover, the image forming apparatus 1 of the second exemplary embodiment performs the following setup processing in the standard mode. Specifically, the reference density patterns, for example, of six tones for each color shown in FIG. 3 are formed firstly. Then, according to the density value of the respective reference density patterns of six tones for each color detected by the reference density detection sensor 55, the image forming conditions are corrected so as to accurately adjust the image density. On the other hand, in an image forming mode other than the standard mode, simplified setup processing (simple setup processing) with lower correction accuracy than in the standard mode may be performed. In the simple setup processing, the image density is adjusted by forming reference density patterns of a smaller number of tones for each color than those of the reference density patterns shown in FIG. 3.

Figure 13:
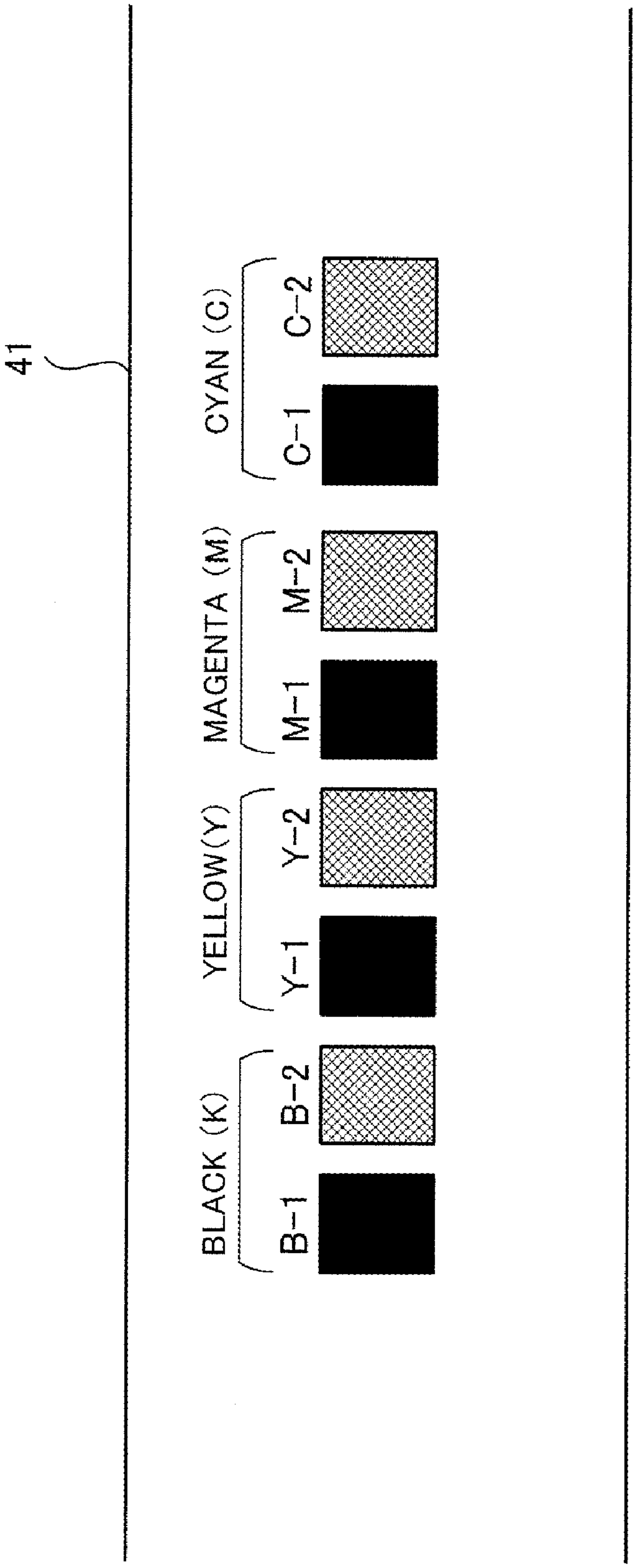
FIG. 13 is a diagram showing an example of the reference density patterns used in the simple setup processing in an image forming mode other than the standard mode.

FIG. 13 is a diagram showing an example of the reference density patterns used in the simple setup processing in an image forming mode other than the standard mode. FIG. 13 shows the example in which two reference density patters of two tones are formed in each of the image forming units 30. For example, two reference density patterns B-1 and B-2 of two tones are formed in the image forming unit 30K of black (K). Similarly, two reference density patterns Y-1 and Y-2 of two tones are formed in the image forming unit 30Y of yellow (Y), two reference density patterns M-1 and M-2 of two tones are formed in the image forming unit 30M of magenta (M), and two reference density patterns C-1 and C-2 of two tones are formed in the image forming unit 30C of cyan (C).

The simple setup processing using these reference density patterns is performed in a shorter time than the normal setup processing using the reference density patterns shown in FIG. 3. The use of the simple setup processing reduces a time required for the setup processing in the less-frequently used image forming mode, and thereby further improves productivity of image formation.

Moreover, when the simple setup processing is employed, correction amounts for various image forming conditions calculated in the simple setup processing may be set smaller than those in the normal setup processing.

For example, assume that both the normal setup processing and the simple setup processing have the same difference $\Delta\delta$ between the detected density value of one of the reference density patterns for each color detected by the reference density detection sensor 55 and its target value in the EEPROM 604 inside the controller 60.

On this assumption, an operation of $f(\Delta\delta)$ based on the difference $\Delta\delta$ is performed to figure out the correction amount in each of the image forming conditions. For instance, an operation of $f_1(\Delta\delta)$ is performed to figure out the correction amount for an image forming condition (for example, the output light amount value LD of the semiconductor laser 27) in the normal setup processing, and an operation of $f_2(\Delta\delta)$ is performed to figure out the correction amount for the same image forming condition in the simple setup processing. In this case, the controller 60 sets the operations of $f_1(\Delta\delta)$ and $f_2(\Delta\delta)$ in the normal setup processing and the simple setup processing, respectively, to satisfy the following formula (2).

$$f_1(\Delta\delta)>f_2(\Delta\delta) \quad (2)$$

In this way, the sensitivity in the correction for the difference $\Delta\delta$ between the detected density value of each color reference density pattern, and the target value stored in the EEPROM 604 inside the controller 60 is set smaller in the simple setup processing with low correction accuracy than in the normal setup processing. This prevents the setting value of each of the image forming conditions in the simple setup processing from deviating from the target value.

Figure 14A:
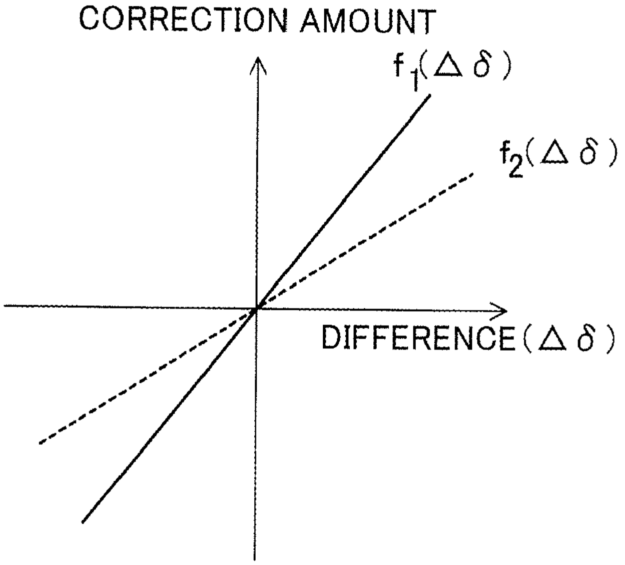
FIGS. 14A to 14C are diagrams showing specific examples of the operations of $f(\Delta\delta)$ to figure out the correction amount in the normal setup processing and the simple setup processing.
Figure 14B:
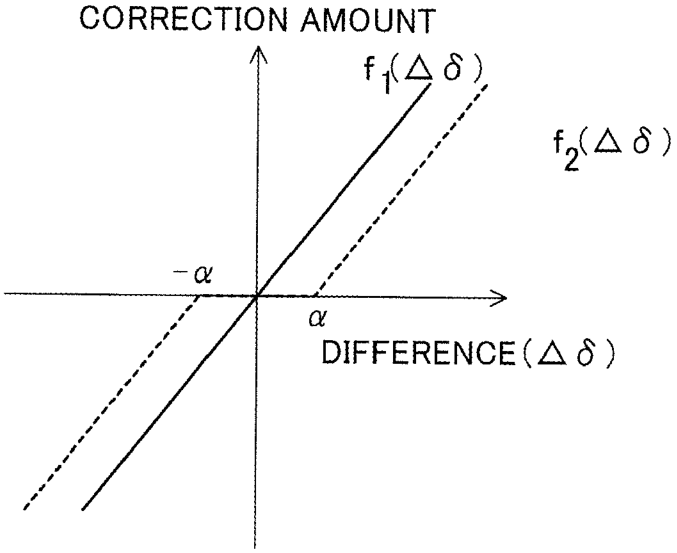
Figure 14C:
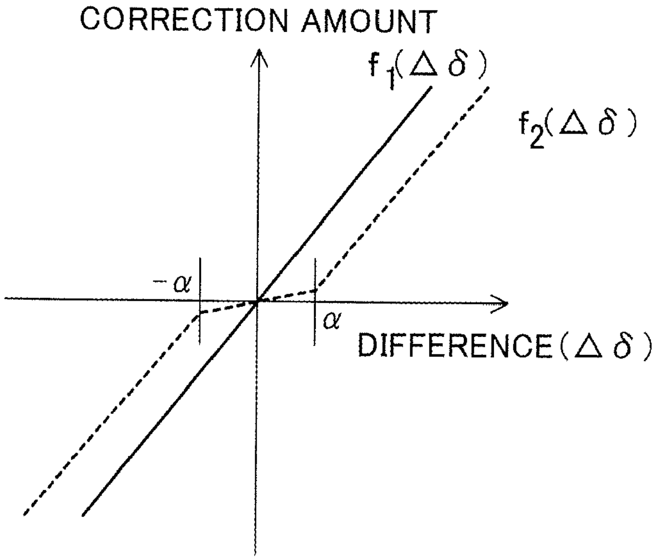

FIGS. 14A to 14C are diagrams showing specific examples of the operations of $f(\Delta\delta)$ to figure out the correction amount in the normal setup processing and the simple setup processing. FIG. 14A shows a case where a linear function is used for the operation of $f(\Delta\delta)$, FIG. 14B shows a case where a non-correction region in which the correction amount is set to zero is provided in a range having a small difference $\Delta\delta$(−

$\alpha \leqq \Delta\delta \leqq \alpha$) in the operation of $f_2(\Delta\delta)$ for figuring out the correction amount in the simple setup processing, and FIG. 14C shows a case where a small correction amount region in which the correction amount is set smaller is provided in a range having a small difference $\Delta\delta$ ($-\alpha \leqq \Delta\delta \leqq \alpha$) in the operation of $f_2(\Delta\delta)$ for figuring out the correction amount in the simple setup processing.

By using the operations of $f_1(\Delta\delta)$ and $f_2(\Delta\delta)$ shown in FIG. 14, the controller 60 prevents the setting value of each of the image forming conditions from deviating from the target value in the simple setup processing.

As described above, in the image forming apparatus 1 of the second exemplary embodiment, a certain image forming mode is set as the standard mode, and the setup processing based on the target value for the prestored image density is performed when the image forming mode is changed from one other than the standard mode to the standard mode. In contrast, when the image forming mode is changed from the standard mode to one other than the standard mode, the first setup processing after the change to the other image forming mode is performed as follows. Firstly, the density value of each color reference density pattern is detected in the first setup processing, and then the detected density value is set as the target value for the image density at the newly-set process speed PS. Then, the setup processing based on the newly-set target value is performed. This reduces a variation in image density in the same image forming mode. In addition, as for a frequently-used mode such as the plain-paper mode, this setup processing reduces a variation in image density between previous printing and next printing in the plain-paper mode, even though printing in another image forming mode is performed between the previous printing and the next printing in the plain-paper mode. Further, the contents in the setup processing are optimized corresponding to a timing of performing the setup processing, thereby improving productivity of image formation.

In addition, unlike a conventional image forming apparatus, the image forming apparatus 1 of the second exemplary embodiment does not perform the setup processing at a timing of every change of the process speed PS, but performs the setup processing at a required timing after every change of the process speed PS. Thereby, the target values are not changed according to the detected state quantities for every change. Even through image quality varies when the image forming process speed is changed, the variation in image quality before and after the adjustment of the image forming conditions after the change of the image forming speed is reduced in comparison with the case where the present invention is not adopted.

More specifically, the setup processing may be set to be performed at a timing when the value of the cumulative number of printed sheets measured by each of the sheet-number counter CNT1 or CNT2 exceeds the certain number of printed sheets determined for a corresponding one of the first process speed PS1 or PS2, that is, at a timing when the certain interval is elapsed. In addition, when the process speed PS is changed to the first process speed PS1, the setup processing may also be performed if the counter value of the sheet-number counter CNT1 exceeds the certain number of printed sheets, and the state quantities at the first process speed PS1 stored in the EEPROM 604 may be again used if the counter value of the sheet-number counter CNT1 does not exceed the certain number of printed sheets.

In the second exemplary embodiment, the controller 60 includes the individual sheet-number counters CNT1 and CNT2 as examples of the measuring unit that each measure an elapsed period after the last adjustment of the image forming conditions. The sheet-number counter CNT1 measures the cumulative number of printed sheets after the last setup processing when the first process speed PS1 is set. Meanwhile, the sheet-number counter CNT2 measures the cumulative number of printed sheets after the last setup processing when the second process speed PS2 is set. Then, the EEPROM 604 stores both the target values for the state quantities at the first process speed PS1 and the target values for the state quantities at the second process speed PS2.

Furthermore, the EEPROM 604 stores each of the target values for the state quantities at the first and second process speeds PS1 and PS2. In another preferred configuration, the EEPROM 604 stores only the target values for the state quantities at the first process speed PS1. In this configuration, when the process speed is changed to the first process speed, the setup processing is performed if the counter value of the sheet-number counter CNT1 exceeds the certain number of printed sheets, or the state quantities at the first process speed PS1 stored in the EEPROM 604 are again used if the counter value of the sheet-number counter CNT1 does not exceed the certain number of printed sheets. In addition, when the process speed is changed to the second process speed, the setup processing may be performed or the target values are changed according to the detected state quantities every time of the process speed change.

It should be noted that, for the computer readable medium storing a program, this program may be executed by loading, to a RAM, the program stored in a reserved area such as a hard disk or a DVD-ROM. In addition, another aspect of this program may be executed by a CPU while being prestored in a ROM. Moreover, when an apparatus is provided with a rewritable ROM such as an EEPROM, only this program is sometimes provided and installed in the ROM after the assembling of the apparatus is completed. In addition, this program may also be transmitted to an apparatus through a network such as the Internet and then installed in a ROM included in the apparatus, whereby the program is provided.

The above-mentioned description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming unit that forms an image on a medium;

a speed changing unit that changes an image forming speed of the image forming unit;

a detecting unit that detects a state quantity indicating a state of the image on the medium formed by the image forming unit; and an adjusting unit that adjusts an image forming condition set by the image forming unit according to a detection result of the state quantity detected by the detecting unit and a target value for the state quantity, the adjusting unit changing the target value for the state quantity according to the state quantity that is detected by the detecting unit after the speed changing unit changes the image forming speed.

2. The image forming apparatus according to claim 1, further comprising a storing unit that stores, as the target value for the state quantity, a value depending on the state quantity detected by the detecting unit for the first time after the change of the image forming speed when the speed changing unit changes the image forming speed.

3. The image forming apparatus according to claim 2, wherein the image forming apparatus comprises a plurality of the storing units, and each of the plurality of storing units corresponds to each of levels of the image forming speed changed by the speed changing unit.

4. The image forming apparatus according to claim 1, wherein the adjusting unit is configured to be capable of selecting one of a plurality of adjustment methods of different adjustment accuracies for setting the image forming conditions, and selects one of the adjustment methods according to a difference between the state quantity indicating the state of the image detected by the detecting unit and the target value for the state quantity.

5. The image forming apparatus according to claim 1, further comprising a storing unit that stores a first image forming speed and a target value for a state quantity at the first image forming speed, wherein the adjusting unit adjusts the image forming condition set in the image forming unit, according to the detection result of the state quantity detected by the detecting unit and the target value for the state quantity at the first image forming speed stored in the storing unit when the speed changing unit changes the image forming speed to the first image forming speed, and the adjusting unit changes the target value for the state quantity according to the state quantity detected by the detecting unit after the speed changing unit changes the image forming speed when the speed changing unit changes the image forming speed to a speed other than the first image forming speed.

6. The image forming apparatus according to claim 5, further comprising a measuring unit that measures a period elapsed after the last detection by the detecting unit in the image forming unit at each level of the image forming speed, wherein in a case where the speed changing unit changes the image forming speed to a speed other than the first image forming speed, and if a measurement result measured by the measuring unit does not exceed a threshold, the adjusting unit adjusts the image forming condition set in the image forming unit according to the detection result of the state quantity detected by the detecting unit and the target value for the state quantity, stored in the storing unit, at the first image forming speed, or if the measurement result measured by the measuring unit exceeds the threshold, the adjusting unit changes the target value for the state quantity according to the state quantity detected by the detecting unit after the speed changing unit changes the image forming speed.

7. The image forming apparatus according to claim 5, wherein the image forming apparatus further comprises:

a setting input unit that receives an input of a setting of the apparatus; and a speed setting unit that determines the first image forming speed according to the input to the setting input unit.

8. The image forming apparatus according to claim 5, wherein the image forming apparatus further comprises:

a measuring unit that measures any one of a cumulative number of times and a cumulative time period of image formation performed by the image forming unit at each level of the image forming speed changed by the speed changing unit; and a speed setting unit that determines the first image forming speed according to the measurement result measured by the measuring unit.

9. The image forming apparatus according to claim 5, wherein in the adjusting unit, a frequency of adjusting the image forming condition in a state where an image forming speed other than the first image forming speed is set is set to be less than the frequency of adjusting the image forming condition in a state where the first image forming speed is set.

10. The image forming apparatus according to claim 5, wherein the adjusting unit is configured to be capable of selecting one of a plurality of adjustments with different setting accuracies for setting the image forming condition, and the setting accuracy for an adjustment selected in a state where an image forming speed other than the first image forming speed is set is set lower than the setting accuracy for an adjustment selected in a state where the first image forming speed is set.

11. The image forming apparatus according to claim 5, wherein in the adjustment unit, an adjustment amount of the image forming condition in a state where an image forming speed other than the first image forming speed is set is set smaller than an adjustment amount of the image forming condition in a state where the first image forming speed is set.

12. The image forming apparatus according to claim 1, wherein the adjusting unit corrects a second state quantity detected after a first state quantity according to the first state quantity detected by the detecting unit after the speed changing unit changes the image forming speed, and adjusts an image forming condition set by the image forming unit according to the second state quantity and a target value of the second state quantity.

13. The image forming apparatus according to claim 1, wherein the adjusting unit calculates an adjusting amount of the image forming condition according to a second state quantity detected after a first state quantity detected by the detecting unit after the speed changing unit changes the image forming speed and the target value of the second state quantity, and corrects the adjusting amount of the image forming condition according to the first state quantity.

14. An image forming apparatus comprising:

a toner image forming unit that forms a toner image on a medium;

a speed changing unit that changes a toner image forming speed of the toner image forming unit;

a detecting unit that detects a density of the toner image on the medium formed by the toner image forming unit;

an adjusting unit that adjusts a toner image forming condition set by the toner image forming unit according to the toner image density detected by the detecting unit and a target value for the toner image density, the adjusting unit changing the target value for the toner image density according to the toner image density that is detected by the detecting unit after the speed changing unit changing the toner image forming speed.

15. A controlling unit comprising:

a speed information obtaining unit that obtains change information of an image forming speed of an image forming unit forming an image on a medium;

a state quantity obtaining unit that obtains a state quantity indicating a state of the image on the medium formed by the image forming unit; and an adjusting unit that adjusts an image forming condition set in the image forming unit according to the obtained state quantity and a target value for the state quantity, the adjusting unit changing the target value of the state quantity according to the state quantity that is obtained by the state quantity obtaining unit after the change information of the image forming speed is obtained by the speed information obtaining unit.

16. The controlling unit according to claim 15, further comprising a storing unit that stores, as the target value for the state quantity, a value according to the state quantity obtained by the state quantity obtaining unit for the first time after the speed information obtaining unit obtains the change information.

17. The controlling unit according to claim 15, further comprising a storing unit that stores a first image forming speed and a target value for a state quantity at a first image forming speed, wherein in a case where the speed information obtaining unit obtains the change information indicating that the image forming speed is changed to the first image forming speed, the adjusting unit adjusts an image forming condition set in the image forming unit according to a state quantity obtained by the state quantity obtaining unit and the target value for the state quantity at the first image forming speed stored in the storing unit, and in a case where the speed information obtaining unit obtains the change information indicating that the image forming speed is changed to an image forming speed other than the first image forming speed, the adjusting unit changes the target value for the state quantity according to the state quantity obtained by the state quantity obtaining unit after the image forming speed is changed.

18. The controlling unit according to claim 15, further comprising a speed setting unit that determines the first image forming speed.

19. An image forming method for adjusting an image forming condition, the image forming method comprising:

obtaining, using a processor, change information of an image forming speed for forming an image on a medium;

obtaining a state quantity indicating a state of the image formed on the medium;

adjusting an image forming condition set for forming the image according to the obtained state quantity and a target value for the state quantity; and changing the target value for the state quantity according to the obtained state quantity after the change information of the image forming speed is obtained.

20. A computer readable medium storing a program causing a computer to execute a process for adjusting an image forming condition, the process comprising:

obtaining change information of an image forming speed for forming an image on a medium;

obtaining a state quantity indicating a state of the image formed on the medium;

adjusting an image forming condition set for forming the image according to the obtained state quantity and a target value for the state quantity; and changing the target value for the state quantity according to the obtained state quantity after the change information of the image forming speed is obtained.

* * * * *